US008918809B2

(12) United States Patent
Schein et al.

(10) Patent No.: US 8,918,809 B2
(45) Date of Patent: Dec. 23, 2014

(54) METHOD AND SYSTEM FOR DISPLAYING ADVERTISING, VIDEO, AND PROGRAM SCHEDULE LISTING

(75) Inventors: Steven M. Schein, Menlo Park, CA (US); James J. Leftwich, Palo Alto, CA (US); David M. Folker, Fremont, CA (US); Keith Hunwick, Mountain View, CA (US); Theresa Alba, Fremont, CA (US); Molly K. King, Fremont, CA (US)

(73) Assignee: Starsight Telecast, Inc., Santa Clara, CA (US)

( * ) Notice: Subject to any disclaimer, the term of this patent is extended or adjusted under 35 U.S.C. 154(b) by 410 days.

(21) Appl. No.: 13/036,721

(22) Filed: Feb. 28, 2011

(65) Prior Publication Data

US 2011/0167448 A1   Jul. 7, 2011

Related U.S. Application Data

(63) Continuation of application No. 11/894,687, filed on Aug. 20, 2007, now Pat. No. 8,181,200, which is a
(Continued)

(51) Int. Cl.
*H04N 5/445* (2011.01)
*H04N 21/858* (2011.01)
(Continued)

(52) U.S. Cl.
CPC ....... *H04N 5/44543* (2013.01); *H04N 21/8586* (2013.01); *H04N 21/4755* (2013.01);
(Continued)

(58) Field of Classification Search
USPC ..................................... 725/37, 39
See application file for complete search history.

(56) References Cited

U.S. PATENT DOCUMENTS 4,706,121 A   11/1987   Young
5,157,768 A   10/1992   Hoeber et al.
(Continued)

FOREIGN PATENT DOCUMENTS

EP   0 693 854   1/1996
EP   0 735 749   10/1996
(Continued)

OTHER PUBLICATIONS

Office Action mailed Sep. 29, 2010 in U.S. Appl. No. 12/748,692, filed Mar. 29, 2010.
(Continued)

*Primary Examiner* — Nasser Goodarzi
*Assistant Examiner* — Mike Hong
(74) *Attorney, Agent, or Firm* — Ropes & Gray LLP

(57) ABSTRACT

A television schedule system and method for displaying television schedule information on a television screen includes a program guide having a schedule information area that depicts the programs that are being presented on each channel at each time during the day. An input device allows the viewer to browse through the schedule information area and/or obtain more information about programs of particular interest. In one aspect, the viewer may watch a program on the currently-tuned channel, while browsing through the other channels on a portion of the television screen. In another aspect, the viewer may watch programs currently being shown on the television, while he or she browses through the program guide. In yet another aspect, the system includes a database, a processor and associated software for automatically customizing the television schedule guide to an individual viewer or a group of viewers, e.g., a family, to facilitate use of the television schedule.

28 Claims, 23 Drawing Sheets

Related U.S. Application Data continuation of application No. 11/502,691, filed on Aug. 11, 2006, now abandoned, which is a continuation of application No. 10/406,745, filed on Apr. 3, 2003, now abandoned, which is a continuation of application No. 09/962,692, filed on Sep. 25, 2001, now abandoned, which is a continuation of application No. 08/847,726, filed on Apr. 28, 1997, now Pat. No. 6,323,911, which is a continuation-in-part of application No. 08/537,650, filed on Oct. 2, 1995, now abandoned.

(60) Provisional application No. 60/023,651, filed on Jun. 17, 1996.

(51) Int. Cl.
| | | |
|---|---|---|
| *H04N 21/475* | (2011.01) | |
| *H04N 21/458* | (2011.01) | |
| *H04N 21/422* | (2011.01) | |
| *H04N 21/442* | (2011.01) | |
| *H04N 5/782* | (2006.01) | |
| *H04N 7/16* | (2011.01) | |
| *H04N 21/482* | (2011.01) | |
| *H04N 21/418* | (2011.01) | |
| *H04N 21/443* | (2011.01) | |
| *H04N 21/258* | (2011.01) | |
| *H04N 21/81* | (2011.01) | |
| *H04N 21/472* | (2011.01) | |
| *H04N 7/088* | (2006.01) | |
| *H04N 21/84* | (2011.01) | |
| *H04N 21/433* | (2011.01) | |
| *H04N 21/4782* | (2011.01) | |
| *H04N 21/488* | (2011.01) | |
| *H04N 21/434* | (2011.01) | |
| *H04N 21/462* | (2011.01) | |
| *H04N 21/478* | (2011.01) | |
| *G06F 3/0481* | (2013.01) | |
| *H04N 7/08* | (2006.01) | |
| *H04L 25/06* | (2006.01) | |
| *H04N 21/431* | (2011.01) | |
| *H04N 21/4722* | (2011.01) | |
| *H04N 21/45* | (2011.01) | |
| *H04N 5/45* | (2011.01) | |
| *H04N 21/47* | (2011.01) | |
| *H04N 5/775* | (2006.01) | |
| *H04N 5/44* | (2011.01) | |

(52) U.S. Cl.
CPC ....... *H04N 21/458* (2013.01); *H04N 21/42203* (2013.01); *H04N 21/44222* (2013.01); *H04N 5/782* (2013.01); *H04N 7/165* (2013.01); *H04N 21/482* (2013.01); *H04N 21/4182* (2013.01); *H04N 21/4181* (2013.01); *H04N 21/422* (2013.01); *H04N 21/4438* (2013.01); *H04N 21/25891* (2013.01); *H04N 21/812* (2013.01); *H04N 21/4821* (2013.01); *H04N 21/47211* (2013.01); *H04N 7/0887* (2013.01); *H04N 21/47214* (2013.01); *H04N 21/84* (2013.01); *H04N 21/47202* (2013.01); *H04N 5/45* (2013.01); *H04N 21/4753* (2013.01); *H04N 21/4828* (2013.01); *H04N 21/4334* (2013.01); *H04N 21/47* (2013.01); *H04N 21/4782* (2013.01); *H04N 21/4882* (2013.01); *H04N 21/4345* (2013.01); *H04N 21/4622* (2013.01); *H04N 21/47815* (2013.01); *H04N 5/775* (2013.01); *G06F 3/0481* (2013.01); *H04N 7/08* (2013.01); *H04L 25/063* (2013.01); *H04N 21/4316* (2013.01); *H04N 21/4722* (2013.01); *H04N 2005/4419* (2013.01); *H04N 21/4532* (2013.01); *H04N 7/163* (2013.01); *H04N 21/42204* (2013.01)
USPC ............................................. 725/39; 725/37

(56) References Cited

U.S. PATENT DOCUMENTS

| | | | |
|---|---|---|---|
| 5,353,121 A | | 10/1994 | Young et al. |
| 5,410,344 A | | 4/1995 | Graves et al. |
| 5,420,858 A | | 5/1995 | Marshall |
| 5,436,676 A | | 7/1995 | Pint et al. |
| 5,479,266 A | | 12/1995 | Young et al. |
| 5,479,268 A | | 12/1995 | Young et al. |
| 5,532,753 A | | 7/1996 | Buchner et al. |
| 5,532,754 A | | 7/1996 | Young et al. |
| D372,462 S | | 8/1996 | Bingham et al. |
| 5,552,833 A | | 9/1996 | Henmi et al. |
| 5,559,549 A | | 9/1996 | Hendricks et al. |
| 5,559,550 A | | 9/1996 | Mankovitz |
| 5,583,560 A | | 12/1996 | Florin et al. |
| 5,585,838 A | * | 12/1996 | Lawler et al. .................. 725/54 |
| 5,585,866 A | | 12/1996 | Miller et al. |
| 5,589,892 A | | 12/1996 | Knee et al. |
| 5,594,509 A | * | 1/1997 | Florin et al. .................... 725/43 |
| 5,596,373 A | | 1/1997 | White et al. |
| 5,604,544 A | | 2/1997 | Bertram |
| 5,617,526 A | | 4/1997 | Oran et al. |
| 5,619,274 A | | 4/1997 | Roop et al. |
| 5,621,456 A | | 4/1997 | Florin et al. |
| 5,621,579 A | | 4/1997 | Yuen |
| 5,629,733 A | | 5/1997 | Youman et al. |
| 5,635,989 A | | 6/1997 | Rothmuller |
| 5,684,525 A | | 11/1997 | Klosterman |
| 5,758,257 A | | 5/1998 | Hertz et al. |
| 5,781,228 A | | 7/1998 | Sposato |
| 5,781,246 A | | 7/1998 | Alten et al. |
| 5,808,608 A | | 9/1998 | Young et al. |
| 5,822,123 A | | 10/1998 | Davis et al. |
| 5,844,620 A | | 12/1998 | Coleman et al. |
| 5,850,218 A | | 12/1998 | LaJoie et al. |
| 5,880,768 A | | 3/1999 | Lemmons et al. |
| 6,002,394 A | | 12/1999 | Schein et al. |
| 6,005,565 A | | 12/1999 | Legall et al. |
| 6,037,933 A | | 3/2000 | Blonstein et al. |
| 6,075,575 A | | 6/2000 | Schein et al. |
| 6,078,348 A | | 6/2000 | Klosterman et al. |
| 6,118,492 A | | 9/2000 | Milnes et al. |
| 6,124,854 A | | 9/2000 | Sartain et al. |
| 6,151,059 A | | 11/2000 | Schein et al. |
| 6,163,345 A | * | 12/2000 | Noguchi et al. .............. 348/564 |
| 6,172,677 B1 | | 1/2001 | Stautner et al. |
| 6,177,931 B1 | | 1/2001 | Alexander et al. |
| 6,239,794 B1 | | 5/2001 | Yuen et al. |
| 6,323,911 B1 | | 11/2001 | Schein et al. |
| 6,388,714 B1 | | 5/2002 | Schein et al. |
| 6,426,779 B1 | | 7/2002 | Noguchi et al. |
| 6,499,138 B1 | | 12/2002 | Swix et al. |
| 6,532,589 B1 | | 3/2003 | Proehl et al. |
| 6,564,378 B1 | | 5/2003 | Satterfield et al. |
| 6,571,390 B1 | | 5/2003 | Dunn et al. |
| 6,681,396 B1 | | 1/2004 | Bates et al. |
| 6,732,369 B1 | | 5/2004 | Schein et al. |
| 6,756,997 B1 | | 6/2004 | Ward, III et al. |
| 6,966,037 B2 | | 11/2005 | Fredriksson et al. |
| 7,062,777 B2 | | 6/2006 | Alba et al. |
| 7,165,098 B1 | | 1/2007 | Boyer et al. |
| 7,380,216 B2 | | 5/2008 | Feig et al. |
| 7,502,590 B2 | | 3/2009 | Suzu |
| 7,681,149 B2 | | 3/2010 | Lahdesmaki |
| 2002/0010926 A1 | | 1/2002 | Lee |
| 2002/0174430 A1 | | 11/2002 | Ellis et al. |
| 2002/0184627 A1 | | 12/2002 | Alba et al. |
| 2003/0046698 A1 | | 3/2003 | Kamen et al. |
| 2003/0066085 A1 | | 4/2003 | Boyer et al. |

(56) References Cited

U.S. PATENT DOCUMENTS

| | | |
|---|---|---|
| 2003/0110499 A1 | 6/2003 | Knudson et al. |
| 2004/0139465 A1 | 7/2004 | Matthews et al. |
| 2005/0015815 A1 | 1/2005 | Shoff et al. |
| 2005/0028208 A1 | 2/2005 | Ellis et al. |
| 2005/0231827 A1 | 10/2005 | Sakaki |
| 2005/0251827 A1 | 11/2005 | Ellis et al. |
| 2006/0116094 A1 | 6/2006 | Suzu |
| 2006/0242666 A1 | 10/2006 | Alba et al. |
| 2006/0262218 A1 | 11/2006 | Querre |
| 2007/0006273 A1 | 1/2007 | Rodriguez et al. |
| 2008/0126989 A1 | 5/2008 | Flores et al. |
| 2008/0184295 A1 | 7/2008 | Alba et al. |
| 2008/0184311 A1 | 7/2008 | Boyer et al. |
| 2008/0271078 A1 | 10/2008 | Gossweiler et al. |
| 2010/0186037 A1 | 7/2010 | Alba et al. |

FOREIGN PATENT DOCUMENTS

| | | |
|---|---|---|
| GB | 2 126 002 | 3/1984 |
| WO | WO 93/22877 | 11/1993 |
| WO | WO 94/13107 | 6/1994 |
| WO | WO 95/01057 | 1/1995 |
| WO | WO 95/01059 | 1/1995 |
| WO | WO 96/04729 | 2/1996 |
| WO | WO 98/38831 | 9/1998 |

OTHER PUBLICATIONS

Office Action mailed Sep. 7, 2010 in U.S. Appl. No. 12/788,999, filed May 27, 2010.

International Search Report for PCT/US98/03058 dated Jun. 17, 1998.

Esaki, H. et al. "High Speed Datagram Delivery Over Internet Using ATM Technology," IEICE Transactions on Communications, vol. E78-B, No. 8, Aug. 1, 1995.

Office Actions and Replies in U.S. Appl. No. 13/027,677, filed Feb. 15, 2011.

Office Actions and/or Replies from U.S. Appl. No. 13/027,677, filed Feb. 15, 2011.

\* cited by examiner

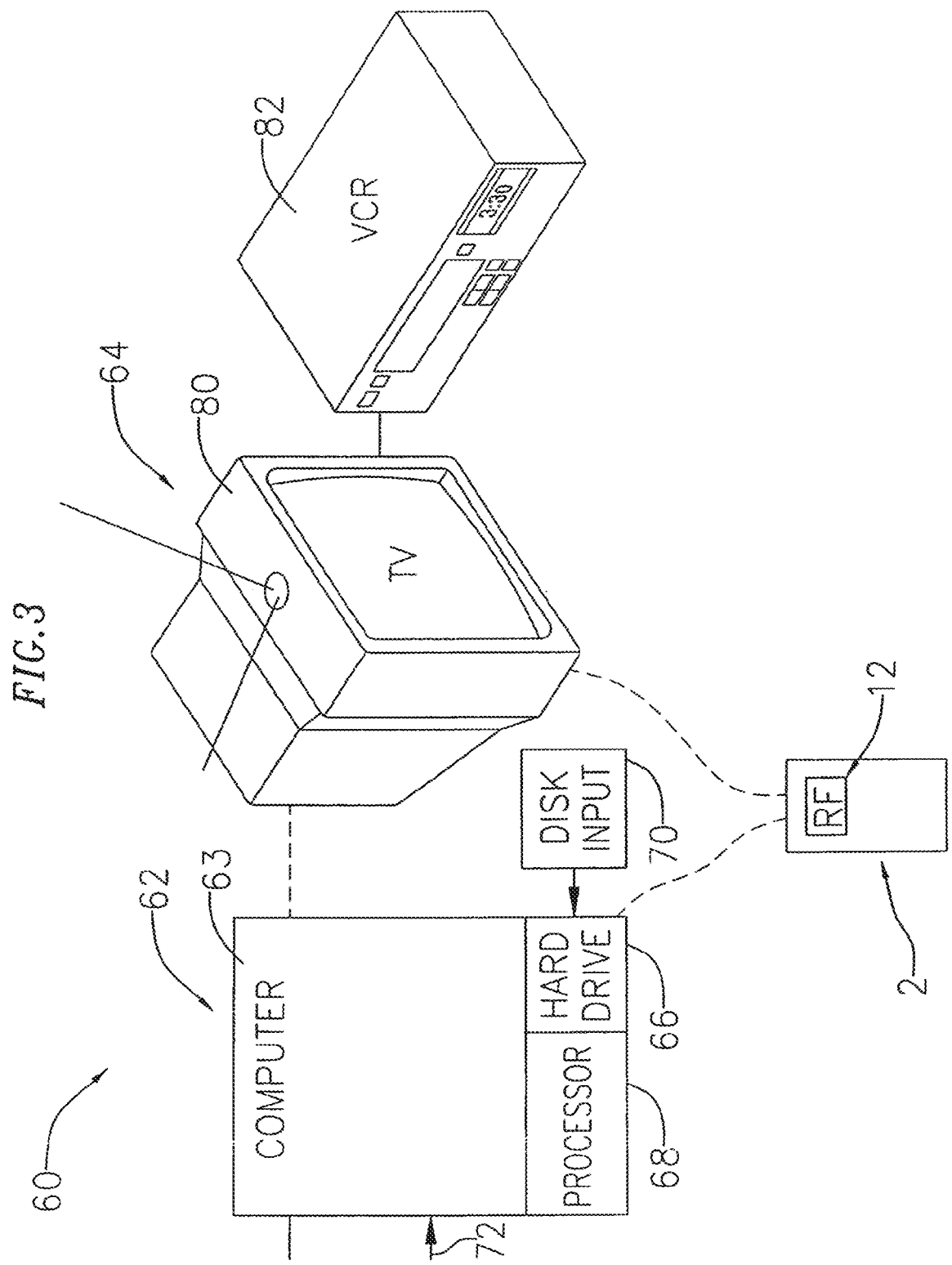

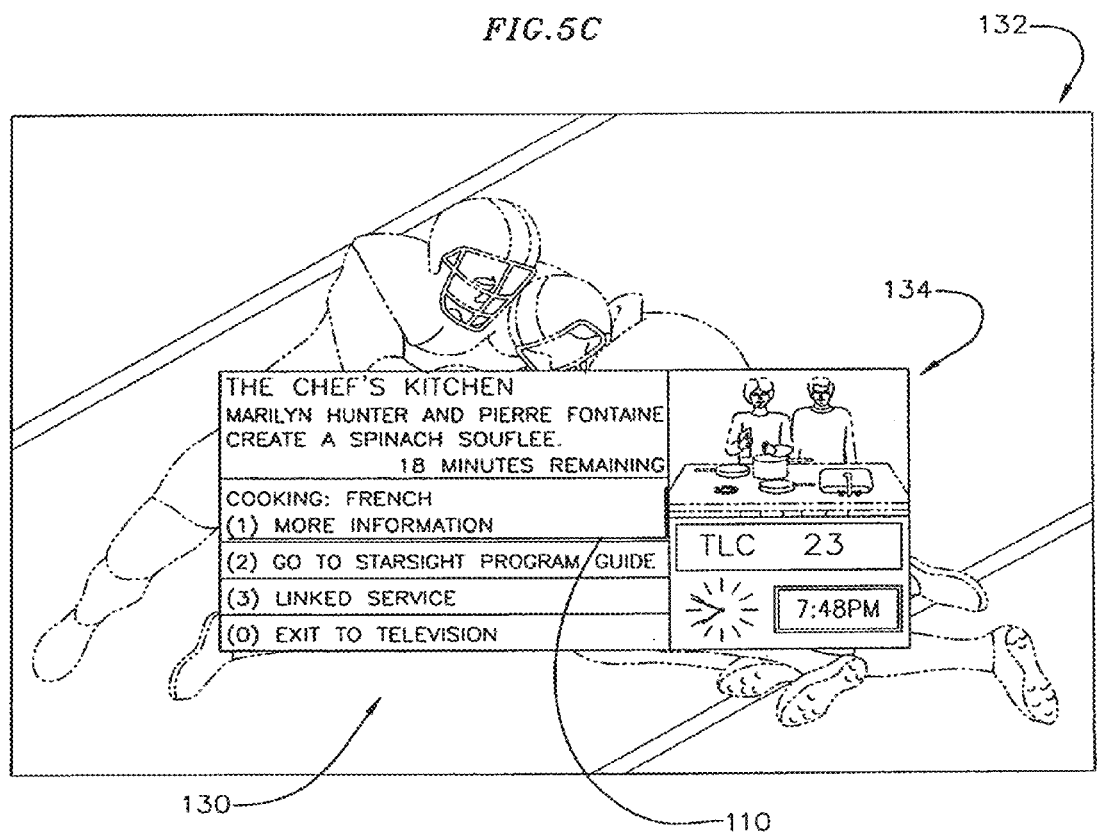

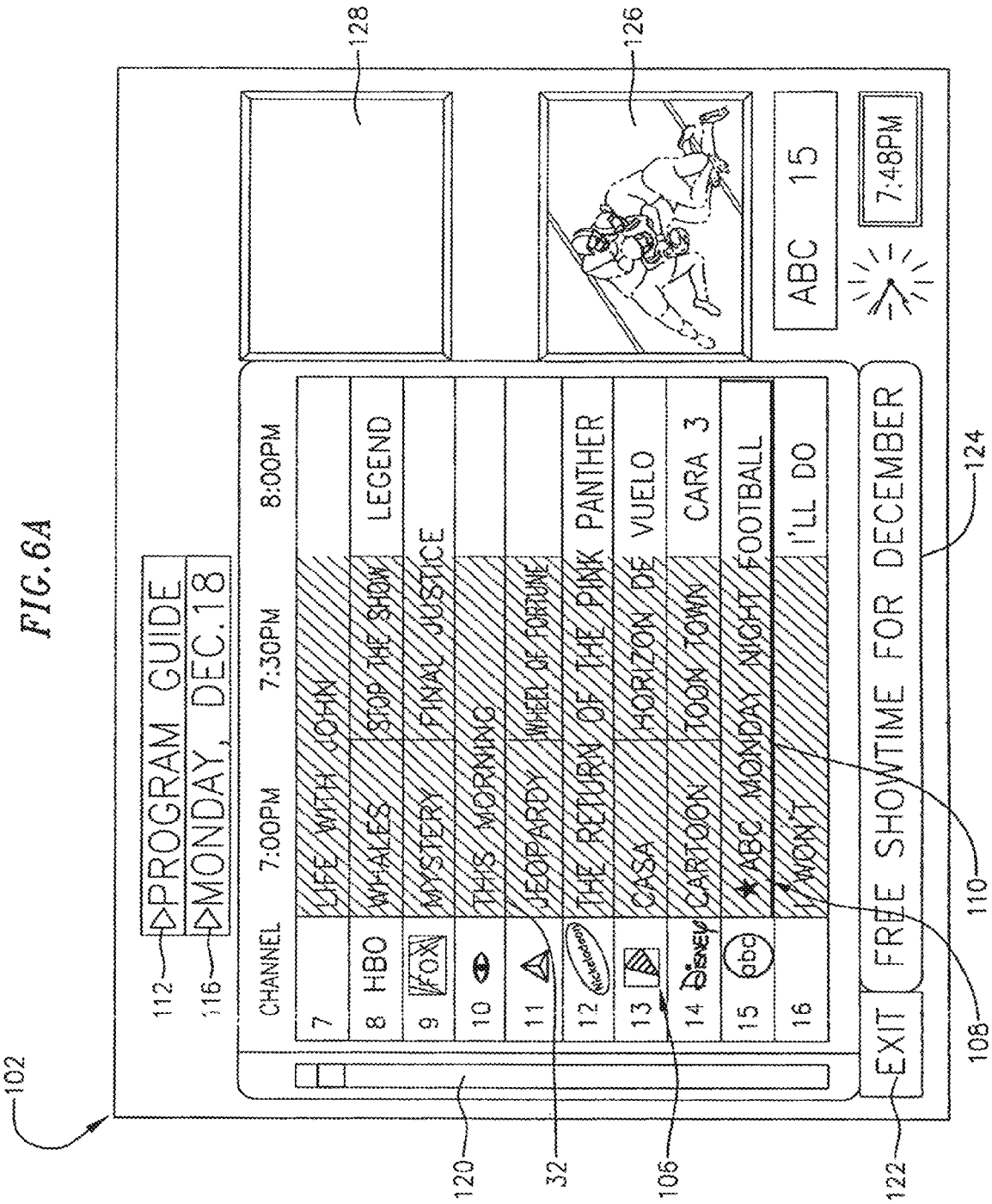

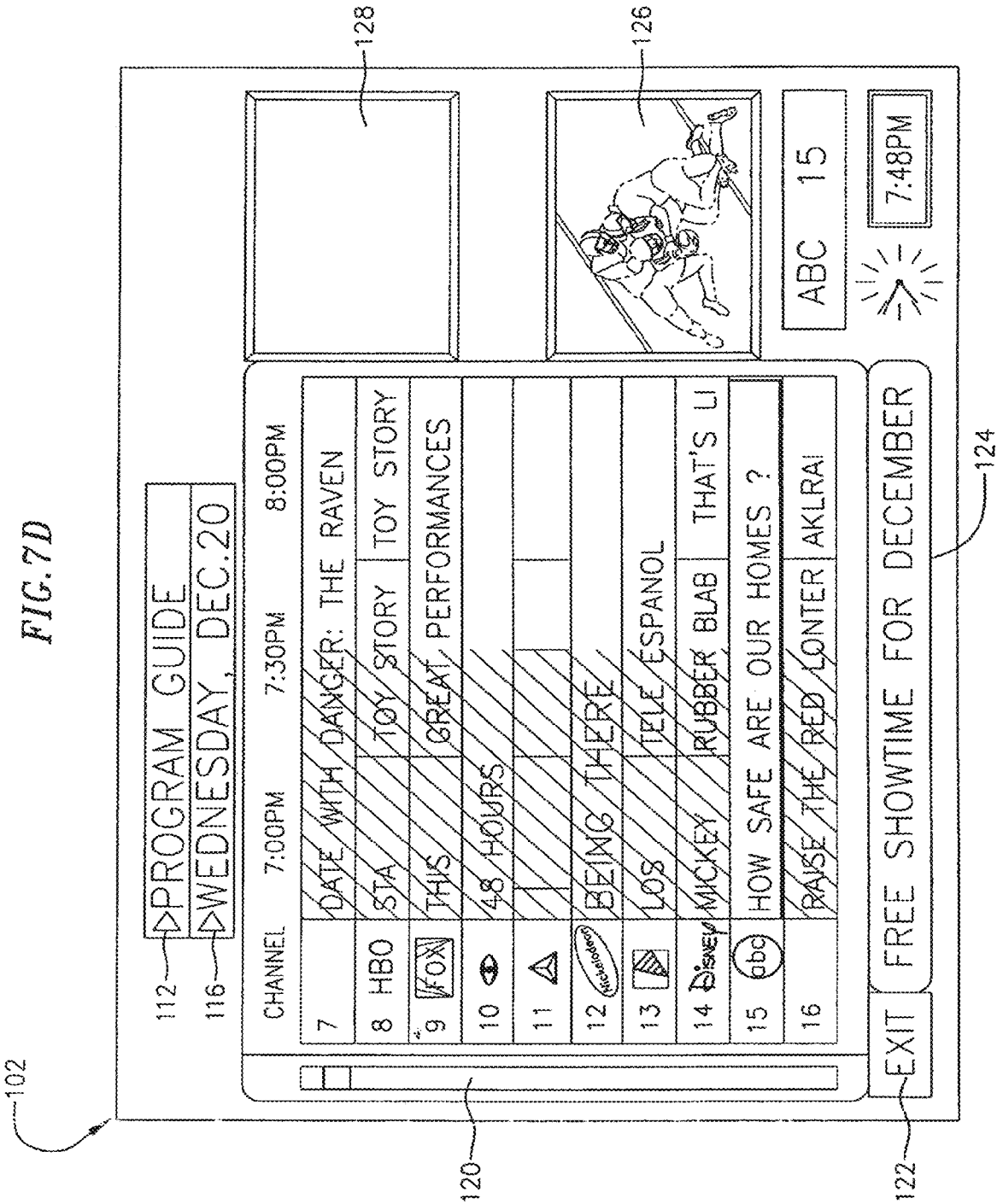

*FIG. 8C*

ABC MONDAY NIGHT FOOTBALL
WASHINGTON REDSKINS AT MINNESOTA VIKINGS.
LIVE COMMENTARY BY FRANK GIFFORD AND
THE ABC CREW.

1 HOUR 18 MINUTES REMAINING

SPORTS: FOOTBALL
(1) MORE INFORMATION

152 —

(2) RECORD ONCE
(3) RECORD DAILY
(4) RECORD WEEKLY
(C) BACK TO PREVIOUS MENU (0) GO BACK TO PROGRAM GUIDE

*FIG. 8D*

ABC MONDAY NIGHT FOOTBALL
WASHINGTON REDSKINS AT MINNESOTA VIKINGS.
LIVE COMMENTARY BY FRANK GIFFORD AND
THE ABC CREW.

THERE IS ROOM FOR SEVERAL ADDITIONAL LINES
OF DESCRIPTION INFORMATION

154 —

SPORTS: FOOTBALL
(1) MORE INFORMATION (2) TUNE TO THIS CHANNEL (0) GO BACK TO PROGRAM GUIDE

*FIG.9A*

LEGENDS OF THE FALL
THREE SONS OF A RETIRED ARMY OFFICER RETURN FROM WORLD WAR 1 TO PURSUE VERY DIFFERENT LIVES.
ANTHONY HOPKINS, BRAD PITT, JULIA ORMOND
2 HOURS

MOVIES: DRAMA
(1) MORE INFORMATION

130—
(2) TUNE TO THIS CHANNEL NOW
(3) RECORD THIS PROGRAM
(4) PUT THIS PROGRAM ON MY FAVORITES LIST...
(5) REMIND ME WHEN THIS PROGRAM AIRS
(6) RESTRICT ACCESS TO THIS PROGRAM
(7) LINKED SERVICE (0) GO BACK TO PROGRAM GUIDE

*FIG.9B*

(2) INDIVIDUAL PROGRAM
(3) SERIES AS A WHOLE
(4) PERFORMERS
(5) CATEGORY
155— (6) GO TO FAVORITES LIST
(C) BACK TO PREVIOUS MENU

*FIG.9C*

(2) INDIVIDUAL MOVIE
(3) DIRECTOR
(4) PERFORMERS
(5) CATEGORY
156— (6) GO TO FAVORITES LIST
(C) BACK TO PREVIOUS MENU

*FIG.9F*

DISPLAY ALL FAVORITES AND REMINDERS
DISPLAY FAVORITES ONLY
DISPLAY REMINDERS ONLY
CLEAR MY LIST OF FAVORITES
CLEAR MY LIST OF REMINDERS
SHOW OTHER USER

*FIG. 10A*

```
LEGENDS OF THE FALL
THREE SONS OF A RETIRED ARMY OFFICER
RETURN FROM WORLD WAR 1 TO PURSUE VERY
DIFFERENT LIVES.
ANTHONY HOPKINS, BRAD PITT, JULIA ORMOND
                                          2 HOURS
```

MOVIES: DRAMA
(1) MORE INFORMATION

130 →
(2) TUNE TO THIS CHANNEL NOW
(3) RECORD THIS PROGRAM
(4) PUT THIS PROGRAM ON MY FAVORITES LIST
(5) REMIND ME WHEN THIS PROGRAM AIRS...
(6) RESTRICT ACCESS TO THIS PROGRAM
(7) LINKED SERVICE (0) GO BACK TO PROGRAM GUIDE

*FIG. 10B*

160 →
(2) REMINDER ONCE
(3) REMINDER FOR WEEKLY SERIES
(4) GO TO REMINDERS LIST
(C) BACK TO PREVIOUS MENU

*FIG. 10C*

```
LEGENDS OF THE FALL
THREE SONS OF A RETIRED ARMY OFFICER
RETURN FROM WORLD WAR 1 TO PURSUE VERY
DIFFERENT LIVES.
ANTHONY HOPKINS, BRAD PITT, JULIA ORMOND
                                          2 HOURS
```

MOVIES: DRAMA
(1) MORE INFORMATION

130 →
(2) TUNE TO THIS CHANNEL NOW
(3) RECORD THIS PROGRAM
(4) PUT THIS PROGRAM ON MY FAVORITES LIST
(5) REMOVE THIS PROGRAM'S REMINDER...
(6) RESTRICT ACCESS TO THIS PROGRAM
(7) LINKED SERVICES (0) GO BACK TO PROGRAM GUIDE

*FIG.11C*

ENTERING PASSWORD
BY ENTERING YOUR PASSWORD YOU ARE CONFIRMING A PURCHASE OR VALIDATION OF YOUR ID. PLEASE ENTER YOUR PASSWORD TO ORDER THIS MOVIE FOR THE LISTED PURCHASE PRICE.

HELP: PASSWORD
(1) INFO ON (LEGENDS OF THE FALL)- $3.95

ENTER PASSWORD FOR DELIVERY IN 7 MINUTES
@7:55PM   (LEGENDS OF THE FALL)  $3.95
• • • • • • • • • •

(2) ACCEPT PASSWORD...
(<) BACK TO PREVIOUS MENU (0) GO BACK TO PROGRAM GUIDE

*FIG.11D*

CONFIRMING YOUR PURCHASE
YOU HAVE SUCCESSFULLY ENTERED YOUR PASSWORD. CLICKING ON "YES" ITEM WILL FINALIZE YOUR PURCHASE.

HELP: CONFIRMING YOUR PURCHASE
(1) INFO ON (LEGENDS OF THE FALL)   $3.95

YOU HAVE SUCCESSFULLY ENTERED YOUR PASSWORD. ARE YOU SURE YOU WANT TO PROCEED TO FINALIZE YOUR ORDER ?

(2) YES
(<) NO (BACK TO PREVIOUS MENU)

(0) GO BACK TO PROGRAM GUIDE

*FIG.11E*

LEGENDS OF THE FALL
THREE SONS OF A RETIRED ARMY OFFICER RETURN FROM WORLD WAR 1 TO PURSUE VERY DIFFERENT LIVES.
ANTHONY HOPKINS, BRAD PITT, JULIA ORMOND
          VIDEO ON DEMAND PRICE-$3.95

MOVIES: DRAMA
(1) MORE INFORMATION

170—

YOUR ORDER CONFIRMED !
12.15.95    OR.#950384383    IT.#345VODL
ACCOUNT 234.95430    PURCHASE: $3.95
(2) OK (BACK TO PREVIOUS MENU)
(3) GO TO YOUR LIST OF PURCHASES (0) GO BACK TO PROGRAM GUIDE

METHOD AND SYSTEM FOR DISPLAYING ADVERTISING, VIDEO, AND PROGRAM SCHEDULE LISTING

CROSS-REFERENCE TO RELATED APPLICATION

This application is a continuation of U.S. patent application Ser. No. 11/894,687, filed on Aug. 20, 2007 (now U.S. Pat. No. 8,181,200), which is a continuation of U.S. patent application Ser. No. 11/502,691, filed on Aug. 11, 2006 (now abandoned), which is a continuation of U.S. patent application Ser. No. 10/406,745, filed on Apr. 3, 2003 (now abandoned), which is a continuation of U.S. patent application Ser. No. 09/962,692, filed on Sep. 25, 2001 (now abandoned), which is a continuation of U.S. patent application Ser. No. 08/847,726, filed on Apr. 28, 1997 (now U.S. Pat. No. 6,323,911), which is a continuation-in-part of U.S. patent application Ser. No. 08/537,650, filed on Oct. 2, 1995 (now abandoned), and claims priority of U.S. Provisional Application No. 60/023,651, filed on Jun. 17, 1996, each of which is fully incorporated herein by reference in its respective entirety.

This application is also related to U.S. patent application Ser. No. 08/837,025, filed Apr. 11, 1997 (now U.S. Pat. No. 6,388,714), and Appendices A, B, and C of U.S. patent application Ser. No. 08/837,025, each of which is fully incorporated herein by reference in its respective entirety.

BACKGROUND OF THE INVENTION

The present invention generally relates to television schedule information, and more particularly to a system and method for displaying a television program guide on a television screen.

As the number of television stations in a metropolitan area or on a cable network has increased, the number of programs of potential interest that are presented to a viewer has risen dramatically. With the use of dish antennas capable of receiving direct satellite signals, the multitude of programs available to the viewer has further increased. Consequently, television schedule systems that are provided directly on the viewer's television screen have been developed to assist the viewer in sorting through these various programs and determining which programs to watch or record. One such television schedule system is disclosed in commonly assigned U.S. Pat. No. 5,353,121 (Young et al.), the complete disclosure of which is hereby incorporated by reference. In one embodiment of Young, the television schedule includes a series of menu screens having an array of cells corresponding to different television programs. The viewer may scroll through the cells to view which television programs are being presented on various channels at various times. In addition, the viewer may select certain cells to obtain more information on the associated program or to pull up other submenus with additional options.

The recent development of television schedule systems, such as the above described patent to Young, have created many new challenges. One such challenge is providing a system and method that allows the viewer to quickly and efficiently navigate through the various menus and submenus of the schedule guide and to interact with the items contained therein. Ideally, the system and method would provide the viewer with the ability to browse through the television guide and/or perform various actions, while still displaying the currently-tuned program on the television screen so that the viewer can keep track of the program. In addition, it would be desirable to provide a system that can be customized for an individual and/or a group of viewers.

SUMMARY OF THE INVENTION

The present invention provides a system and method for displaying schedule information on a visual interface, such as a television screen, a computer monitor or the like. The present invention also provides a system and method for allowing the viewer to navigate and interact with a program guide that is displayed, for example, on the viewer's television screen. The program guide will usually include a schedule information area that depicts the programs that are being presented on each channel at each time during the day with an input device, such as a remote control device, pointing device, mouse, keyboard, microphone or the like, the viewer can browse through the schedule information area and/or obtain more information about programs of particular interest.

In one aspect of the invention, a system and method is provided for allowing the viewer to watch a program on the currently-tuned channel of a television, while browsing through the other channels on a portion of the television screen. The system includes a browsing window for displaying program information over a portion of the television screen in conjunction with the primary display. The browsing window is usually smaller than the main program guide and located in a convenient place on the television screen, e.g., in a corner, so that the viewer can simultaneously view the primary display and the browsing window. The browsing window includes an active window for displaying programs on channels other than the currently-tuned channel, and an input device for switching the program that is displayed on the active window. In a preferred configuration, the browsing window further includes an information window for allowing the viewer to access a television schedule program guide and to obtain more information on the program that is shown in the active window.

In another aspect of the invention, a system and method is provided for allowing the viewer to watch programs currently being shown on the television, while the viewer browses through the program guide. In this embodiment, the program guide includes a smaller, active window for displaying a program that is currently being shown on a television channel. The input device has a controller for interacting with the active window to control the program that is shown therein. For example, the active window may show the program on the currently-tuned channel, i.e., the channel that the viewer was watching prior to activating the program guide. Alternatively, the active window may show the programs that the viewer selects in the program information area. In this embodiment, each program title is contained within a cell or window. As the controller moves a cursor, for example, to each cell within the program information area, the program displayed on the active window will change so that the program displayed on the active window corresponds to the program title within the cell containing the cursor.

In yet another aspect of the invention, a system and method are provided for indicating the amount of time left in each program in the program guide. In this embodiment, the program guide includes a matrix of cells, with each cell containing information associated with a television program, and having a length that is proportional to a length of the television program. Each cell will include a visual display for displaying an amount of time left in the associated television program. For example, the visual display can be a physical icon indicating the amount of time left in the program. Alternatively, each cell can be highlighted in such a way that either the highlighted or non-highlighted portion of the cell represents the amount of time left in the associated television program. In the latter embodiment, the highlighted or non-highlighted portion of the cell will be reduced with time to continuously indicate the amount of time left in the associated program.

In yet another aspect of the invention, a system and method is provided for automatically or manually customizing the television schedule guide to an individual viewer or a group of viewers, e.g., a family. In this embodiment, the program guide includes a matrix of cells, with each cell containing information associated with a television program. The input device includes a controller for moving a cursor to each cell and for selecting the television program associated with each cell. The system further includes a memory for storing the television programs that have been selected by the viewer. The programs can be selected for a variety of reasons, such as designating the program as a favorite, placing a reminder to watch the program or, when the television schedule system includes a recording device, placing an automatic reminder to the program guide to record the program.

In a specific configuration, the system further includes a visual display, such as a physical icon within the program's cell, for indicating that a program has been selected. In addition, the program guide includes a selection window that displays some or all of the programs that have been selected by the viewer. The input device will allow the viewer to activate and deactivate the selection window, and to move between each program within the selection window and activate programs to obtain information associated with the selected program.

In a preferred embodiment, the system includes a database containing each program within the television schedule. The database may be included within a computer integrally combined with the television (e.g., PCTV), a computer that is coupled to the television through suitable lines, or the database may be accessed from a remote computer, e.g., via the internet or other communication medium. Within the database, each program is associated with a variety of criteria or features, such as particular actors, actresses, directors, the type of movie (e.g., action, comedy) and the like. When the viewer selects a program as a favorite, for example, he or she will have the option of designating the criteria or reason(s) that the program is a favorite (i.e., actor, director, etc.). In an exemplary embodiment, the computer will include a processor and suitable software for automatically searching the database for other programs having the same criteria. The processor may then place the programs that include the designated criteria into the selection window and provide visual indication of each program in the matrix of cells in the program guide. In this way, the program guide will automatically customize itself to the individual viewer to facilitate use of the television schedule.

BRIEF DESCRIPTION OF THE DRAWINGS

FIG. 3 is a schematic view of a representative computer system coupled to a television system incorporating the remote control device of the present invention.

FIGS. 5A-5C are schematic views illustrating a method for selecting a program information menu, moving to the program guide of FIG. 4A and browsing through information menus from other programs with the remote control device of FIG. 1.

FIGS. 6A-6D illustrate a method for navigating from the program guide to a mode menu and selecting a different mode.

FIGS. 7A-7D illustrate a method for navigating from the program guide to a submode menu and selecting a different submode.

FIGS. 8A-8D illustrate a method for opening an information menu, scrolling down to other options and opening an information submenu.

FIGS. 9A-9F illustrate a method for selecting a favorite item.

FIGS. 10A-10D illustrate a method for selecting a program reminder.

FIGS. 11A-11E illustrate a Video On Demand menu and an associated submode menu.

DESCRIPTION OF THE SPECIFIC EMBODIMENTS

The present invention provides a schedule system and method for displaying schedule information on a visual interface, such as a television screen, computer monitor or the like. The system and method is particularly useful for use with television schedule information. The television schedule information will be presented in a program guide having a schedule information area depicting the program that are being shown on each channel for a period of time, e.g., a day, week or longer. In one aspect of the invention, the viewer may watch a program on the currently-tuned channel, while browsing through the other channels on a portion of the television screen. In another aspect of the invention, the viewer may watch programs currently being shown on the television, while he or she browses through the program guide. In yet another aspect of the invention, the system includes a database, a processor and associated software for automatically customizing the television schedule guide to an individual viewer or a group of viewers, e.g., a family, to facilitate use of the television schedule.

The television schedule system will include an input device, such as a remote control device, pointing device, mouse, keyboard, microphone or the like, to allow the user to browse through the schedule information area and/or obtain more information about programs of particular interest. In a specific configuration, the input device will comprise a housing or casing and an input assembly on the exterior surface of the casing. The casing will usually resemble the generally rectangular shape of typical television remote control devices. However, the casing may also be similar to other convention input devices, such as a mouse, a joystick, a computer keyboard, etc., or the casing may have a specialized, non-conventional shape. The casing will include a controller for allowing the television viewer to move along the television screen either freely or through specific areas or windows on the screen. The controller may comprise a trackball, cursor controller, pointing device, a microphone for allowing voice activation, a number of keys or buttons that function to move the viewer around the screen, or the like. In the preferred embodiment, the controller comprises a scrolling mechanism for displacing a movable cursor through a matrix of cells or windows on the screen. The cursor may comprise a physical icon on the screen, or it may be represented by highlighting or other visual indications of the cells or windows that are scrolled through by the viewer.

Figure 1:
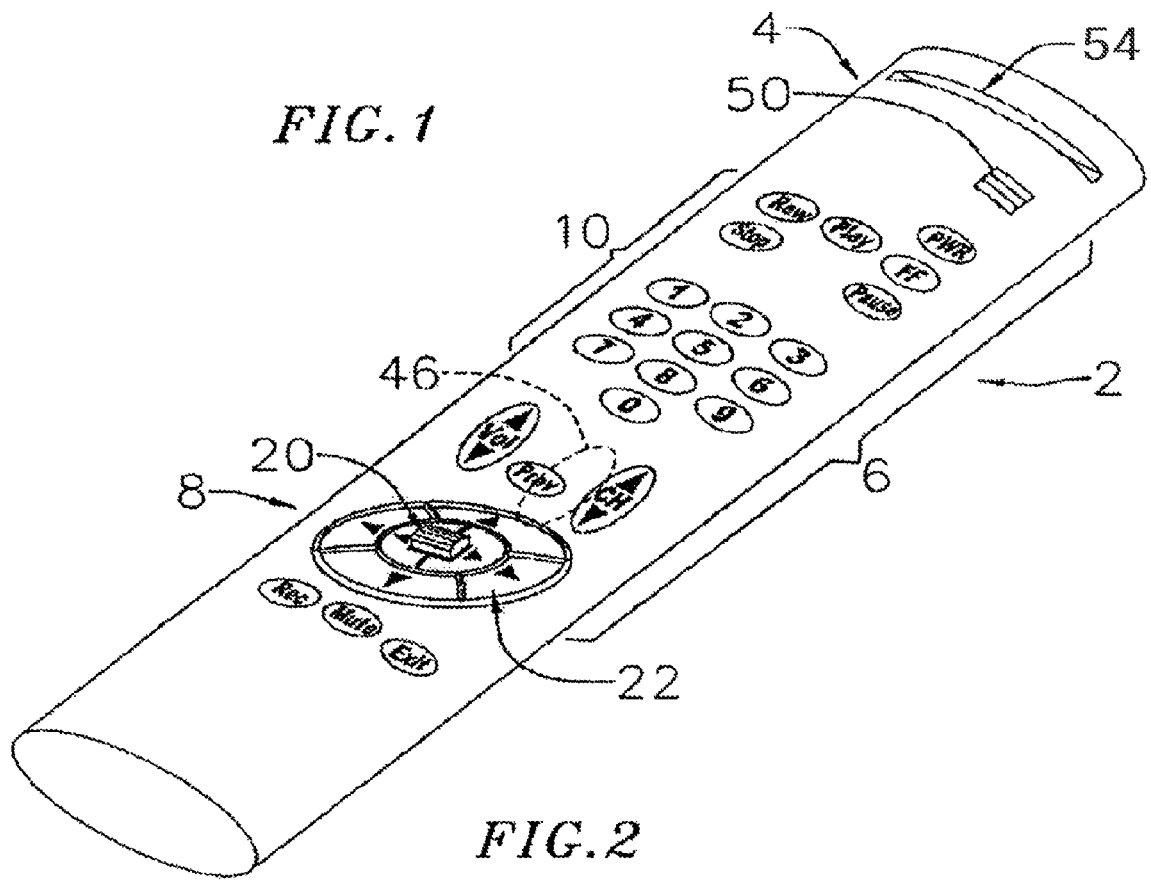
FIG. 1 is a perspective view of a remote control device according to the principles of the present invention.

Referring to the drawings in detail, wherein like elements are indicated by like numerals, a representative remote control device 2 for facilitating the use of television schedule system of the present invention is illustrated. Of course, it should be clearly understood that the remote control device shown in FIGS. 1 and 2 is merely representative of one type of remote control device that may be used with the present invention.

As shown in FIG. 3, remote control device 2 generally comprises a casing 4 having a viewer input assembly 6 for controlling a television, computer or VCR and for utilizing television schedule information on a television screen, as discussed below. Input assembly 6 generally includes a cursor control assembly 8 for displacing a cursor on a display screen, such as a television screen, and a plurality of dedicated function buttons 10 for performing various functions, such as changing channels, operating a VCR, changing the volume, etc. In addition, dedicated function buttons 10 may be used for other interactions requiring numeric input, such as inputting security codes, credit card numbers, etc.

As shown in FIG. 3, remote control device 2 further includes an RF transmitter 12 for transmitting signals generated by the viewer through viewer input assembly 6 to, for example, a processor within a personal computer, a television or a VCR. RF transmitter 12 may be substituted with, for example, IR emitters, modulated light signals (i.e., a signal sent to optical fiber), or even a hardware connection. Remote control device 2 will also include a power source, such as a battery (not shown).

Figure 2:
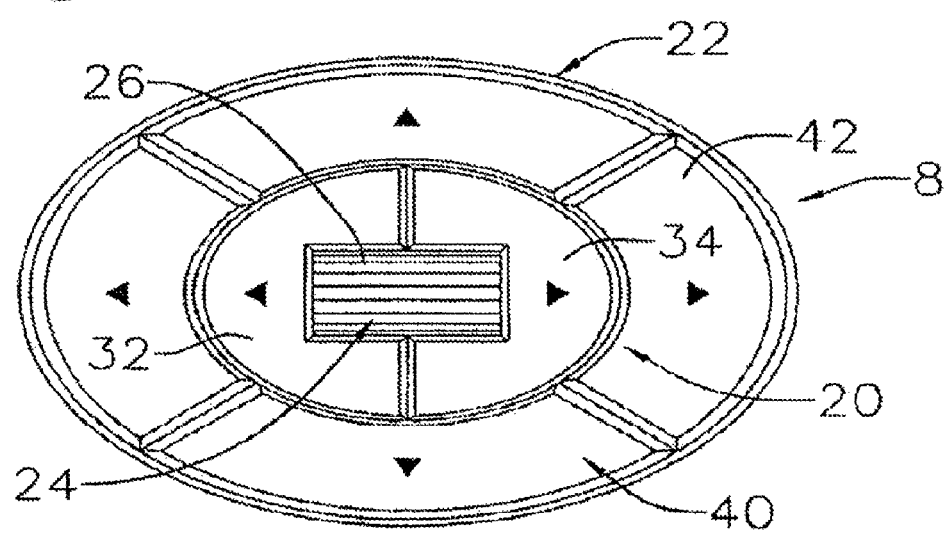
FIG. 2 is an enlarged view of local and global controllers of the remote control device of FIG. 1.

Referring to FIG. 2, the cursor control assembly 8 of the present invention will now be described in detail. Cursor control assembly 8 includes a local controller 20 for moving the cursor within a designated screen area or window on the display screen and a global controller 22 for navigating among different windows on the display screen, as discussed in further detail below. Local controller 20 comprises a vertical scroll mechanism for scrolling cursor in the y-direction or vertically through an individual window or menu. The vertical scroll mechanism is preferably a rolling cylinder 24 rotatably mounted to casing 4 around an axis perpendicular to the longitudinal axis of casing 4. Rotation of cylinder 24 moves the cursor vertically through the window or menu of the display screen. In a preferred embodiment, the window will be made up of at least a vertical column of cells and cylinder button 24 will move the cursor up and down the column.

Rolling cylinder 24 preferably includes means for providing tactile feedback to the viewer so that cylinder 24 to facilitate operation of cylinder 24 without looking at remote control device 2 (i.e., so the viewer can look at the television screen). In the preferred configuration, cylinder 24 includes a plurality of detents or ridges 26 on its outer surface that indicate to the viewer, either by tactile feel or by sound, that the cursor is moving through each cell in the window or menu.

Local controller 20 further includes a horizontal scroll mechanism for moving the cursor in an "x" direction or horizontally across the display screen. As shown in FIG. 2, the horizontal scroll mechanism preferably includes first and second buttons 32, 34 located on either side of rolling cylinder 24. Depressing buttons 32, 34 moves the cursor left or right across a row of items in an individual window of the display screen. Preferably, the viewer will be required to press one of the buttons 32, 34 for each item the cursor moves through in the horizontal direction. However, it should be noted that the invention is not limited to this configuration and buttons 32, 34 can be configured so that continuous depression of one button 32, 34 moves the cursor horizontally through a plurality of items. Alternatively, cylinder 24 may be configured for horizontal movement so that both horizontal and vertical movement can be carried out with a single button.

Cursor control assembly 8 further includes a selector switch for selecting an item on the display screen when the cursor is contiguous with that item. In a specific configuration, the selector switch is rolling cylinder 24. Depression of cylinder 24 will select or activate the item or pull down a menu associated with that item. This feature of the present invention allows viewers to both vertically scroll through items in a menu and select these items without moving their thumb from cylinder 24.

Global controller 22 preferably comprises a screen navigation ring 40 having a plurality of direction buttons 42 surrounding local controller 20. The exact number of direction buttons 42 in navigation ring 40 will typically depend on the number and relative locations of the different information areas on the display screen. In a specific configuration, global controller 22 will include four buttons 42 controlling left, right, up and down movement of the cursor along the television screen.

As an alternative to navigation ring 40, remote control device 2 may include a trigger or clutch button 46, as shown in Fig. i. Clutch button 46 can be depressed to provide dual modality for local controller 20. Specifically, pressing clutch button 46 will move local controller 22 between a first mode, where cylinder 24 and horizontal scroll mechanism 30 move the cursor between different items within a particular information area on the display screen, and a second mode, where cylinder 24 and horizontal scroll mechanism 30 move the cursor between different information areas oh the screen. Clutch button 46 is preferably located on the back side of casing 4 so that the viewer can easily depress button 46 with his or her fingers when holding the device.

Referring again to FIG. 1, viewer input assembly 6 of remote control device 2 further includes a voice recognition device for receiving spoken commands from the viewer and converting the spoken commands into signals to facilitate use of television schedule information. Typically, the voice recognition device will include a microphone 50 on remote control device 2 for receiving the spoken commands and converting them into audio signals and a microprocessor (not shown) that includes speech recognition circuitry contained therein for receiving the audio signals and performing various tasks based on the spoken commands. The microprocessor may be contained within the remote control device or within a television set, a computer, VCR or the like. Alternatively, the speech recognition circuitry may be accessed from another computer or a datastream of information, such as a web site on the internet, and downloaded into the television schedule system.

The voice recognition device of the present invention may further include a trigger button (not shown) on remote control device 2 for activating or deactivating microphone 50. This allows the viewer to speak to other people in the room without accidentally triggering commands through microphone 50. The trigger button is normally in the up position, which corresponds to microphone 50 being in the deactivated state. When the viewer wishes to input a spoken command, message or data to the VCR, television or computer, the viewer must depress the trigger button which causes a signal to be sent to a processor (not shown) to activate microphone 50. Once microphone 50 is activated, it will input the received audio signals (e.g., spoken commands) to the processor.

Remote control device 2 further includes a mechanism for inputting and recognizing a viewer's identification (i.e., credit card number, social security number, etc.) for authorizing the viewer to purchase products or services from the television schedule system. In a preferred configuration, the identification mechanism is a slot 54 in casing 4 sized for receiving a credit card, data card, security card or other viewer identification card, as shown in FIG. 1. In this configuration, remote control device 2 includes a recognition device for reading a code on the credit card when the credit card is swiped through slot 54. A process will convert the credit card's code into signals representing the viewer's identification. Alternatively, the identification mechanism may comprise numeric or symbolic keys on casing 4, such as the numeric keys shown in FIG. 1. In this embodiment, the numeric keys may be used to input a security code, such as a credit card number, social security number or the like.

FIG. 3 illustrates a representative television schedule system 60 for use with remote control device 2 of the present invention. As shown, system 60 includes a computer system 62 coupled to a television system 64. In the preferred embodiment, computer system 62 includes a standard computer 63 which is, for example, any personal computer, (e.g., IBM compatible, Macintosh and the like). Computer 63 can also be located within a set top box (e.g., a DSS box), or the computer may be located remote from the viewer's home, e.g., an external server or host computer. In the latter embodiment, the television schedule system 60 will be capable of accessing and downloading an application or applet from the computer through, e.g., the internet or other communication media. The computer contains a hard drive 66 and a processor 68. These units are usually automatically included in the computer 63. A disk input 70 is used to provide the computer 63 with various additional software. A data line 72 is connected to an available serial, parallel or other data port on the computer 63. This line 72 is used to connect other devices/components to computer.

In another embodiment, computer system 62 may be combined with television system 60 to form a PCTV. In this embodiment, the computer will usually include a processor that may be used solely to run the program guide and associated software, or the processor may be configured to run other applications, such as word processing, graphics, or the like. The computer will usually be incorporated into the television set so that the television display can be used as both a television screen and a computer monitor. Usually, the PCTV will include a number of input devices, such as a keyboard, a mouse and a remote control device, similar to the one described above. However, these input devices may be combined into a single device that inputs commands with keys, a trackball, pointing device, scrolling mechanism, voice activation or a combination thereof.

Television system 64 includes a television 80 which may be any commercially available television. Television system 64 may or may not include a videotape recorder (VCR). In this embodiment, a VCR 82 is coupled to television. This VCR can be, for example, any commercially available VCR or any other type of recording device (analog or digital). Computer 63 and television 80 can be directly connected by a line 84 or remotely connected so that computer 63 and television 80 can be located in different rooms within a private residence or commercial building. In the preferred embodiment, a computer program provided on diskettes, CD Rom or other medium contains the software needed for receiving, organizing and displaying data for a television schedule guide (see FIGS. 4-11). These diskettes are inserted into disk input 70 and the software for these diskettes is stored within the computer 63 on the hard drive or on another mass storage location. This action can be performed by, for example, the viewer or service person. The computer program can also be provided, for example, via downloading from a satellite, transmission through the internet or other online service, or transmission through another type of land line. A more detailed description of a preferred computer system for use with the present invention is described in commonly assigned, co-pending U.S. patent application Ser. No. 08/537,650, filed Oct. 2, 1995, the complete disclosure of which is hereby incorporated by reference.

In another embodiment, computer system 62 may be combined with television system 60 to form a PCTV. In this embodiment, the computer will usually include a processor that may be used solely to run the program guide and associated software, or the processor may be configured to run other applications, such as word processing, graphics, or the like. The computer will usually be incorporated into the television set so that the television display can be used as both a television screen and a computer monitor. Usually, the PCTV will include a number of input devices, such as a keyboard, a mouse and a remote control device, similar to the one described above. However, these input devices may be combined into a single device that inputs commands with keys, a trackball, pointing device, scrolling mechanism, voice activation or a combination thereof.

In this embodiment, remote control device 2 will send input to computer 63, which then transmits signals, via an appropriate RF transmitter or the like (not shown), to television system 64. The data for the television schedule system can be obtained from a variety of databases. For example, on-line providers (Prodigy, America On Line, CompuServe, MSN, At&T, etc) may provide access to a database which contains the television schedule information. These online information providers can transmit data to television 80. To accomplish this, television 80 or computer 63 will include a modem, which can be connected to a telephone line, cable modem, ISDN line, DSS channel or the like, and software for searching and providing the data to computer 63.

FIGS. 4-11 illustrate a television schedule system and method according to the present invention. In Appendix B, which is attached to co-pending U.S. patent application Ser. No. 08/837,025, filed Apr. 11, 1997, of which has been incorporated by reference, entitled "Starsight Interactive Television Program Guide, Phase III", that further illustrates the representative television program guide. Appendix A, which is also attached to co-Pending U.S. patent application Ser. No. 08/837,025, filed Apr. 11, 1997, of which has been incorporated by reference, entitled "Using Starsight 2", to illustrate an alternative television program guide according to the present invention.

Figure 4A:
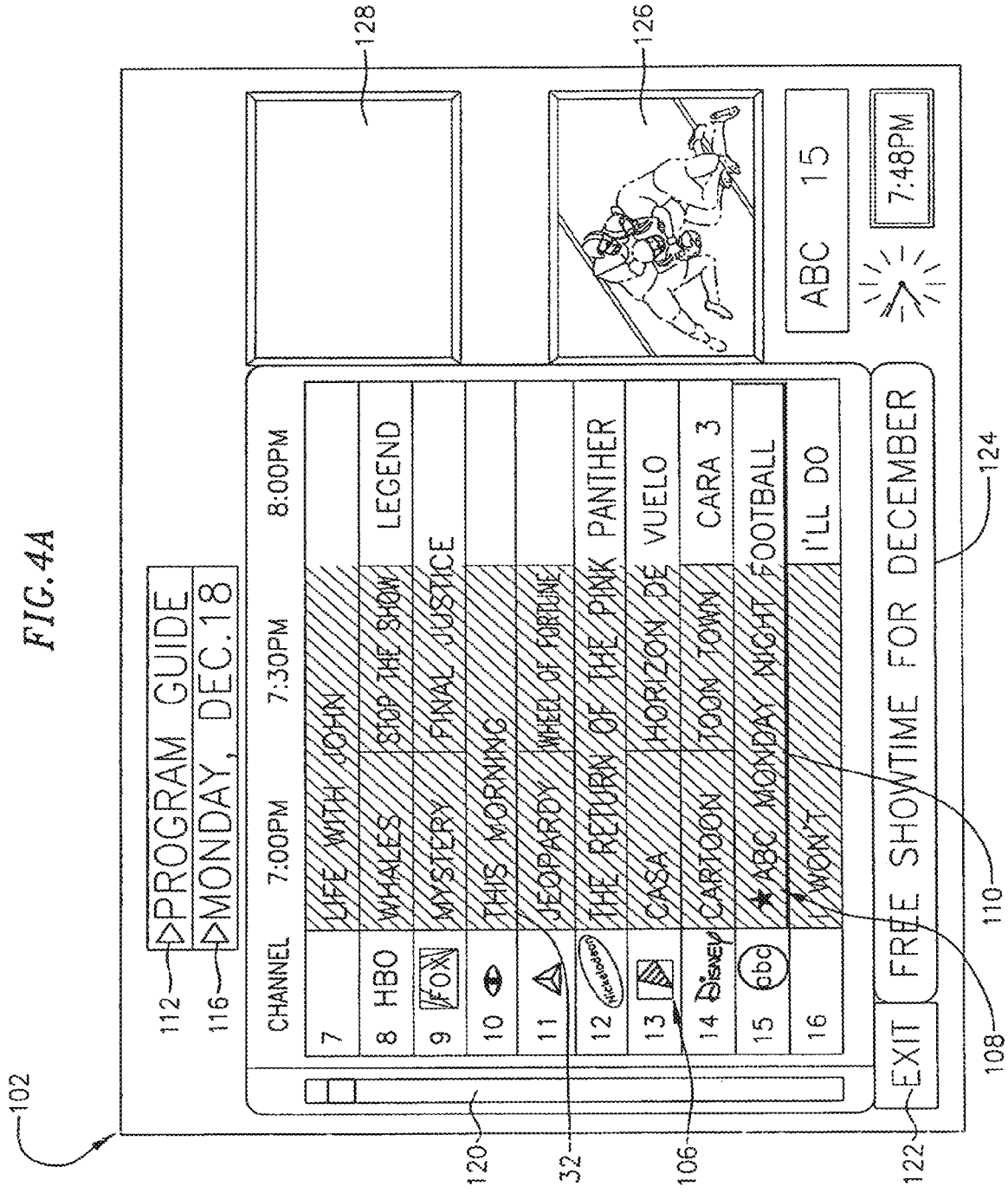
FIGS. 4A and 4B are schematic views of a representative program guide and a channel guide, respectively, for use with the remote control device of Fig. in a television schedule system.
Figure 4B:
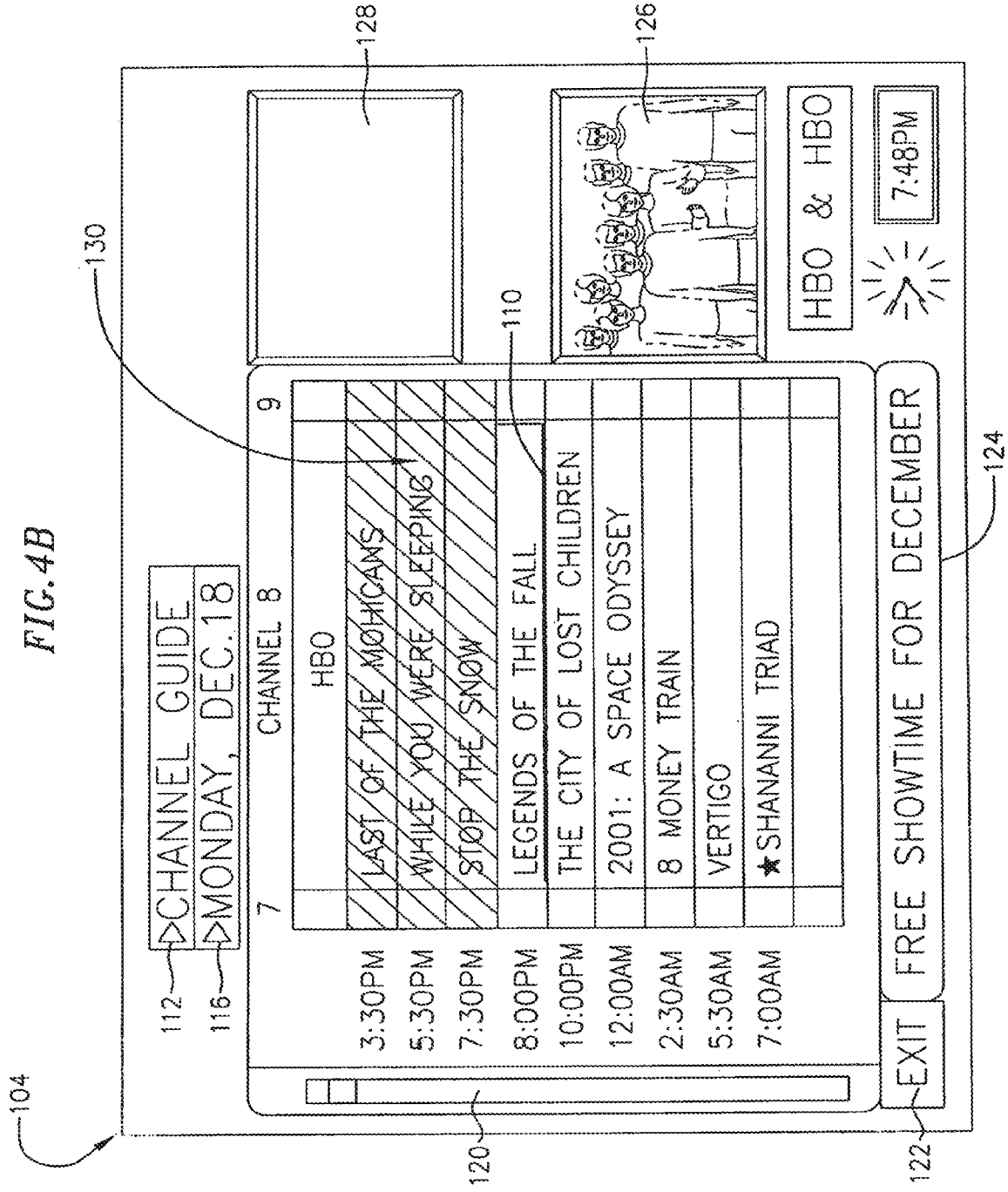

FIGS. 4A and 4B illustrate a program guide 102 and a channel guide 104, respectively, for the television schedule system of the present invention. The program guide 102, which is the primary mode in the television schedule system, includes a number of screen information areas or windows in a particular screen where the viewer operates an input device, such as the remote control device 2 described above, to move around vertically and horizontally and to interact with that screen area's function. Preferably, the currently active screen area will be indicated to the viewer, for example, by changing the background color from a light greyscale metallic to a brighter, active color. Within each screen area are one or more items, typically arranged in a matrix or grid so that the viewer can scroll through the grid. The items can be selected or activated with the input device. Activation of an item will invoke a Submenu, a Dialog, a Panel, invoke an action or the like. In an exemplary configuration, device 2 is configured so that double clicking on cylinder 24 will invoke an item's associated menu or Submenu and automatically activate the default menu item. In addition, device 2 may include further shortcuts, such as mediated signals that are accomplished by simultaneously holding in clutch button 46 and cylinder 24.

As shown in FIG. 4A, program guide 102 preferably includes a schedule information area 106 having a program matrix 108 of cells or items that depict the shows that are being presented on each channel at each time during the day. Program guide 102 conveniently lists the channels in a vertical column to the left of the program matrix 108 and the times in a horizontal row above matrix 108. As shown, the viewer may vertically scroll through a particular time or horizontally scroll through a channel. As the viewer scrolls through matrix 108, a cursor 110 will indicate the viewer's location within the matrix 108. Alternatively, the item may be automatically highlighted with a brighter color to indicate the viewer's location. Preferably, program matrix 108 will also be shaded to indicate the portion of each show that has already been presented. For example, as shown, in FIG. 4A, the shading extends to 7:48 (the current time as indicated at the bottom right of program guide 102) to indicate which portion of the show the viewer has already missed.

As shown in FIG. 4A, program guide 102 includes a number of other information areas. For example, program guide 102 includes a mode menu area 112 that indicates the currently active mode (i.e., program guide 102) and allows the viewer to pull down a mode menu 114 (see FIG. 6B). Program guide 102 also includes a date area 116 that indicates the date reflected in program matrix 106 and allows the viewer to pull down a date submenu 118 (see FIG. 7B) to change the date. In other submodes, the submode menu will display options for ordering or displaying lists that are appropriately related to the submode. A proportional scroll bar 120 located to the left of program matrix 106 is visually proportional to the total information in program matrix 106 to provide visual feedback as the viewer vertically scrolls through matrix 106. In addition, scroll bar 120 may be used for large-scale movement through hundreds of channels/sources by navigating to bar 120 and then vertically moving bar 120 upward or downward. An exit area 122 allows the viewer to immediately exit back to the television by navigating to exit area 122 clicking on exit area 122. A program area 126 depicts the currently tuned program and a preview window area 128 can be used for all types of promotional, descriptional, or contextual video or graphics, such as a short preview of the show that is currently being highlighted in show matrix 106. Preview window area 128 may also be interactional similar to the other areas of guide 102.

In an exemplary configuration, program area 126 displays the currently tuned program "live" so that the viewer can browse through program matrix 106 without missing the action on the currently tuned program. This feature allows the viewer, for example, to keep track of the score of a football game while browsing through the program matrix or performing other interactions with the system, such as purchasing goods or services, searching for more information on a program, etc. In another configuration, the viewer may set program area 126 to change as the viewer browses through program matrix 106 so that area 126 depicts the highlighted program in the matrix. This allows the television viewer to quickly view each program without exiting from the program guide 102.

The program guide may also include a variety of additional areas to facilitate use of the television schedule system, present information to the viewer or advertise programs or other products. For example, a scrolling commercial message 124 may be located underneath program matrix 106 that advertises programs or products from program sponsors, etc. The viewer may navigate to message 124 and click on the input device to receive more information or to purchase the product or program. A two second delay or a suitable input from the viewer will open the scrolling message up into its info menu (not shown). This function of ordering items is not limited to videos. For example, the program may access other contextual linked services such as a commercial store, etc., to allow the purchaser to buy a wide variety of different services or goods directly or indirectly linked to a particular program. For example, an Info Menu for Monday Night Football may allow the viewer to scroll through submenus that allow the viewer to purchase Washington Redskins' caps, Minnesota Vikings' caps or any NFL cap. The viewer has a choice to follow a program's link back to the commercial area where a larger selection of items and services are available. A product like the cap above may lead the viewer directly to an NFL proshop, whereas a link to a movie on demand may lead back to a commercial film library. A more complete description of a television schedule system incorporating contextual linked services is described in co-pending, commonly assigned U.S. patent application Ser. No. 08/837,025, filed on Apr. 11, 1997, to Schein et al., and its Appendices A, B, and C, the complete disclosure of which are hereby incorporated by reference.

FIG. 4B illustrates the television schedule system of the present invention in the channel guide mode. As shown, channel guide 104 is similar to program guide 102 except that it includes an information screen area 130 that is reversed from the information screen area 106 in the program guide. Thus, the viewer can scroll vertically to move forward and backward in time along one channel and horizontally to move from channel to channel.

Figure 5A:
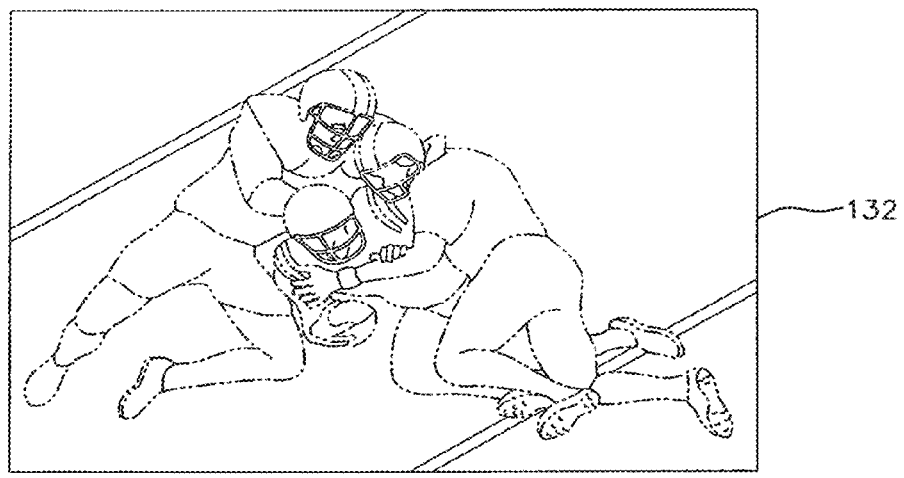
Figure 5B:
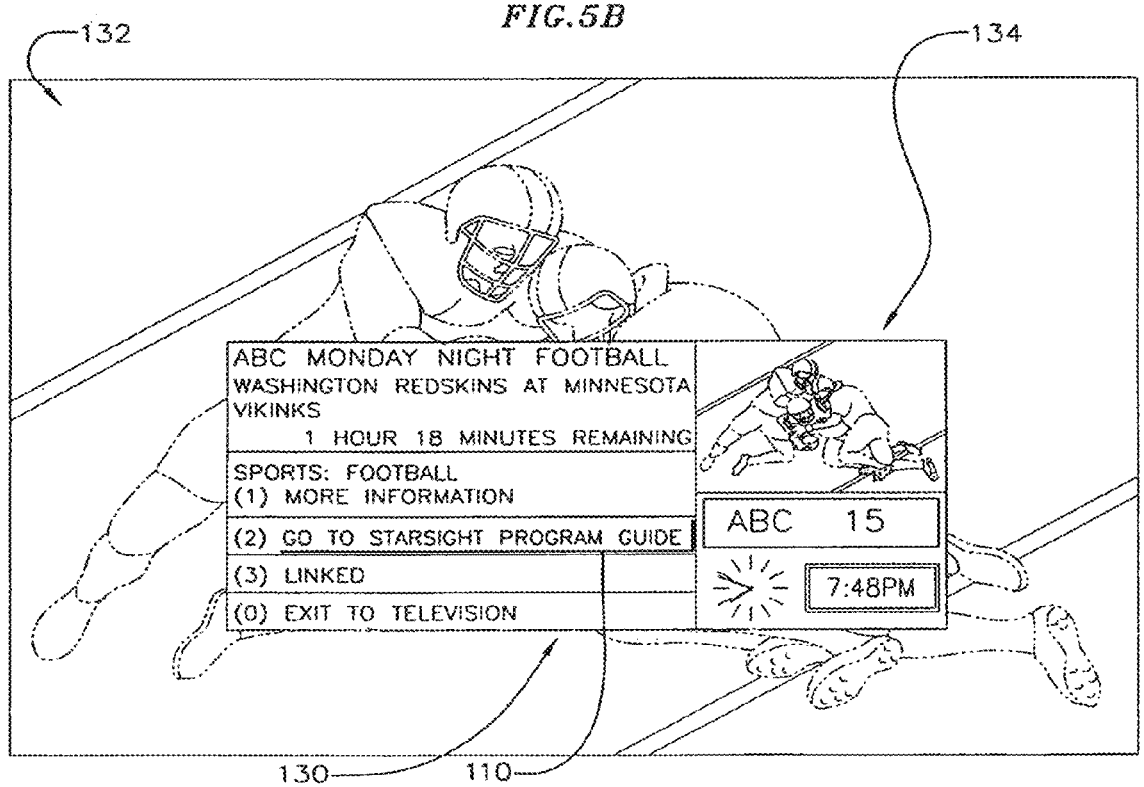

A method for using the television schedule system of the present invention will now be described. FIGS. 5A-5C illustrate a method of accessing program guide 102 from a currently tuned program and browsing through other currently tuned programs. As shown in FIG. 5A, the viewer is watching a television show on a display screen 132, such as a Monday Night Football game featuring the Washington Redskins versus the Minnesota Vikings. Clicking on the input device automatically causes a Program InfoMenu 130 to pop up on a portion of the television screen 132 (see FIG. 5B). Program InfoMenu 130 may allow the viewer to obtain more information about the currently tuned program, move to program guide 102, move to contextual linked services (discussed below), or exit InfoMenu 130 back to the television show. The viewer may vertically scroll through these options, and select one of the options. For example, clicking on the "Go to program guide" section immediately transfers the viewer to the program guide, as shown in FIG. 4A.

To browse other currently tuned programs, the viewer employs the channel controls (i.e., function buttons 10, see FIG. 1). This allows the viewer to browse through other information menus while viewing the currently tuned program (see FIG. 5C). Alternatively, clutch button 46 may be depressed to switch the modality of local controller 20 and allow the viewer to browse through the channels with cylinder 24. This allows the viewer to browse without taking his or her thumb off cylinder 24 and without looking at remote control device 2. In an exemplary configuration, InfoMenu 130 includes a browsing window 134 that displays ("live") the program in InfoMenu (FIG. 5C). This feature allows the viewer to actually view the programs as he/she browses through them. A single click of cylinder 24 would take the viewer to the browsed program. The remote control device may also include means for switching the sound between the currently tuned program and the program in the browsing window 134.

Figure 6B:
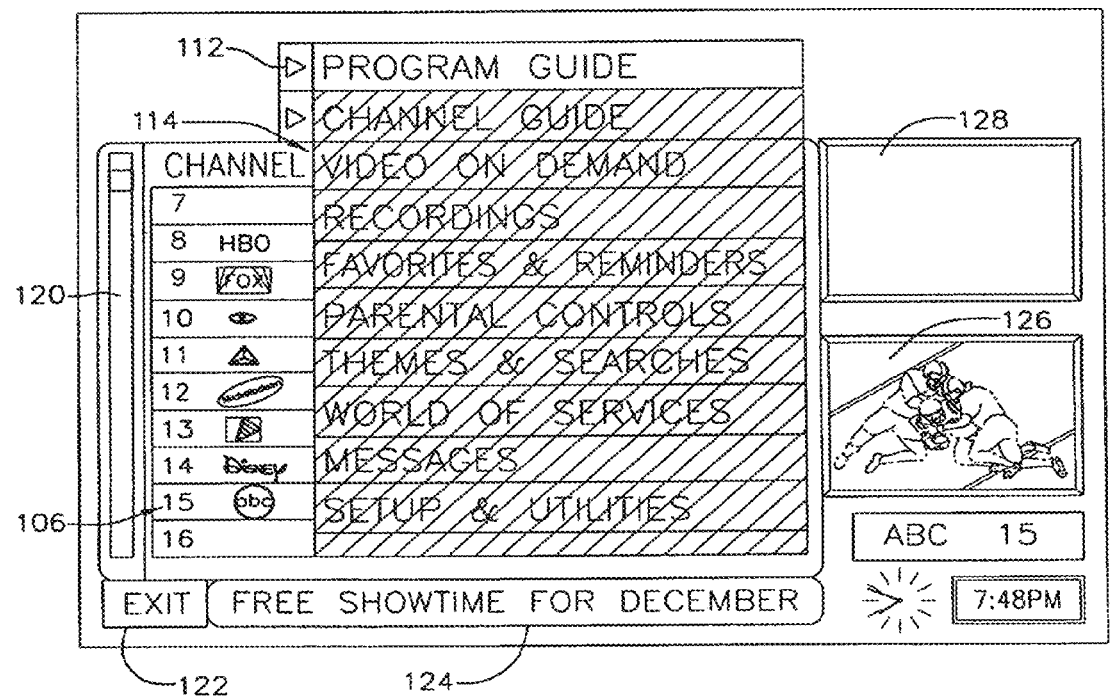
Figure 6C:
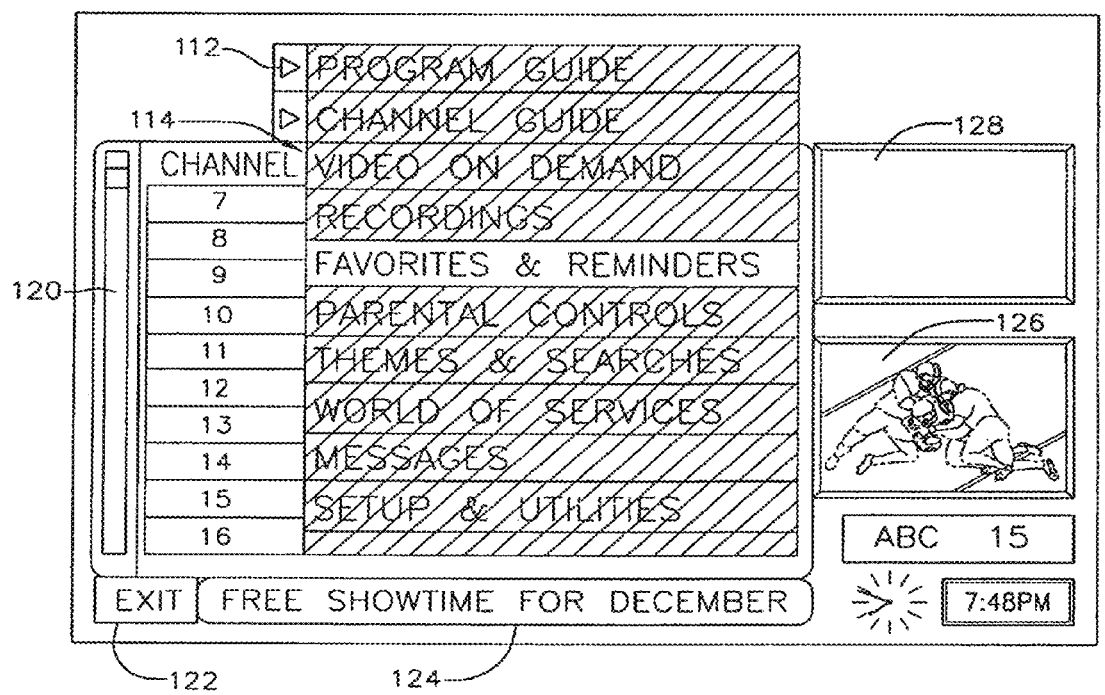
Figure 6D:
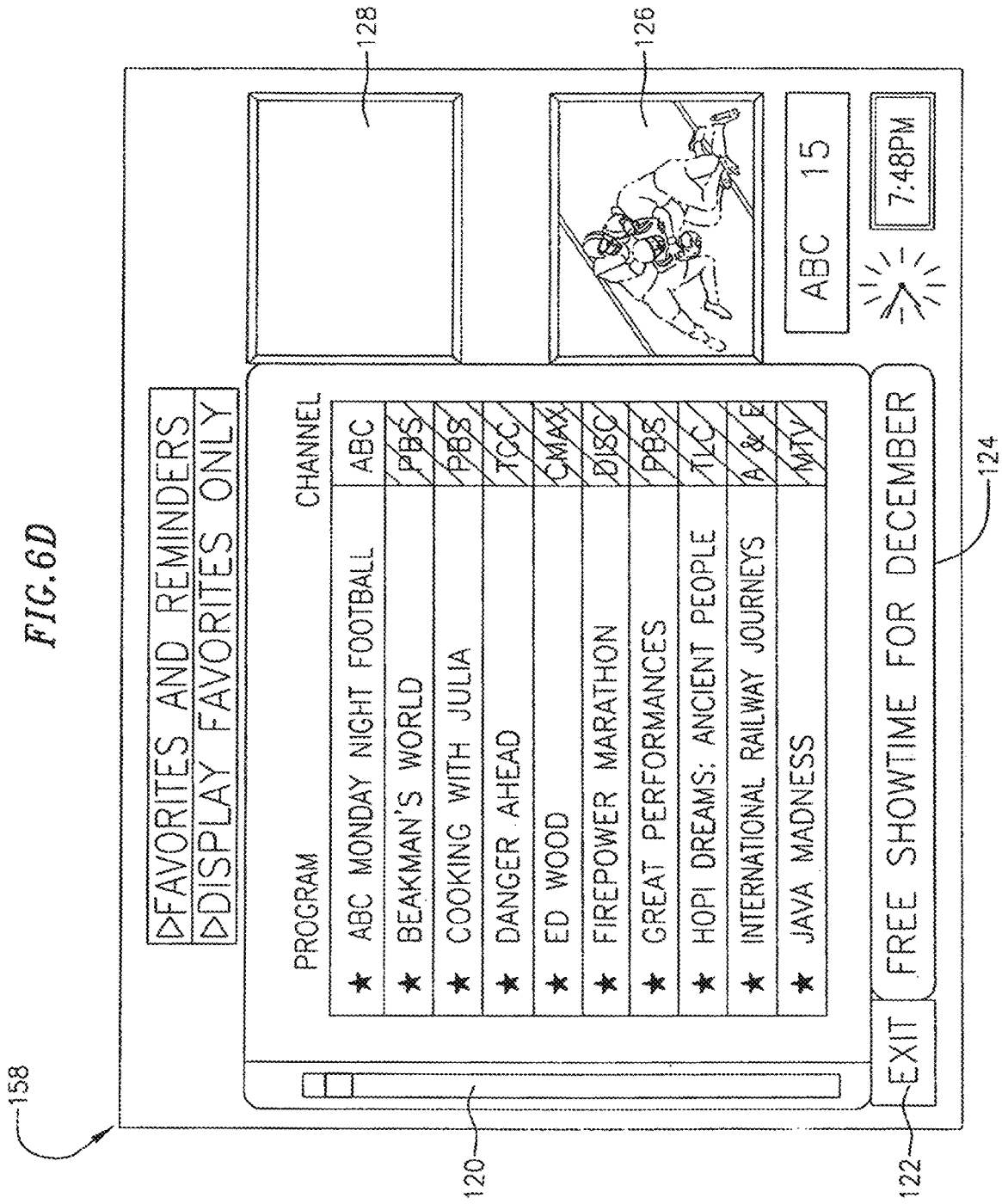

FIGS. 6A-6D illustrate a method for changing the mode of the television schedule system. As shown in FIG. 6A, the viewer starts in program guide 102, which can be accessed through the Infomenu 130 of the currently tuned program as discussed above or by double clicking on cylinder 24 from the television screen (which will automatically select the default item within the Infomenu). The viewer may navigate to the Mode Menu, which will automatically pull down, allowing the viewer to scroll up and down the list of modes and to click on a menu item to select a different mode. For example, if the viewer wishes to see the Favorites and Reminders Menu 158, the viewer clicks on "Favorites and Reminders" and moves to this mode, as shown in FIG. 6D. Note that the design of the representative remote control device 2 allows the viewer to easily scroll through the various menus of the program guide without looking at remote control device 2. In addition, the viewer can access various modes and scroll through the different menus simply by using his or her thumb.

Figure 7A:
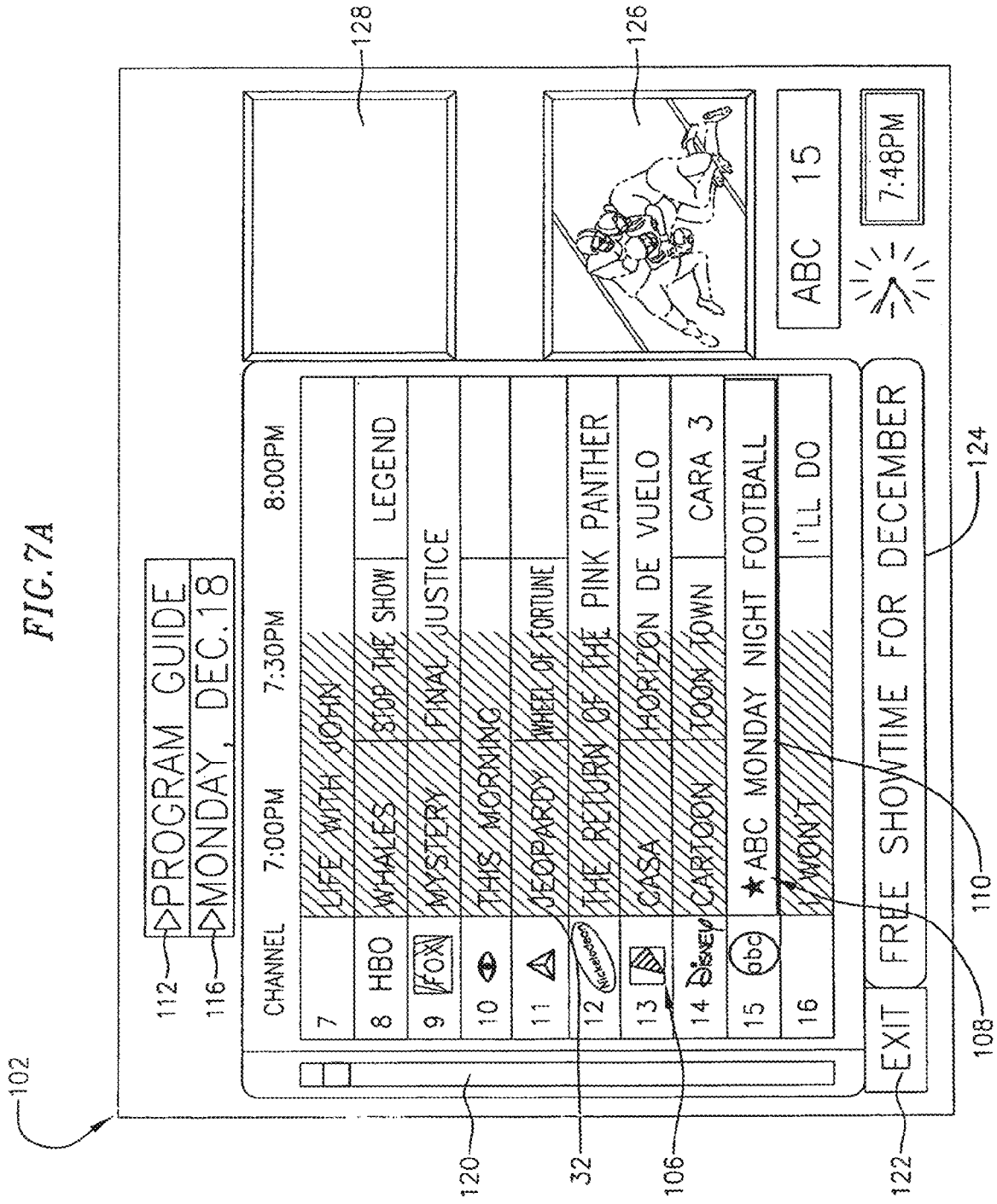
Figure 7B:
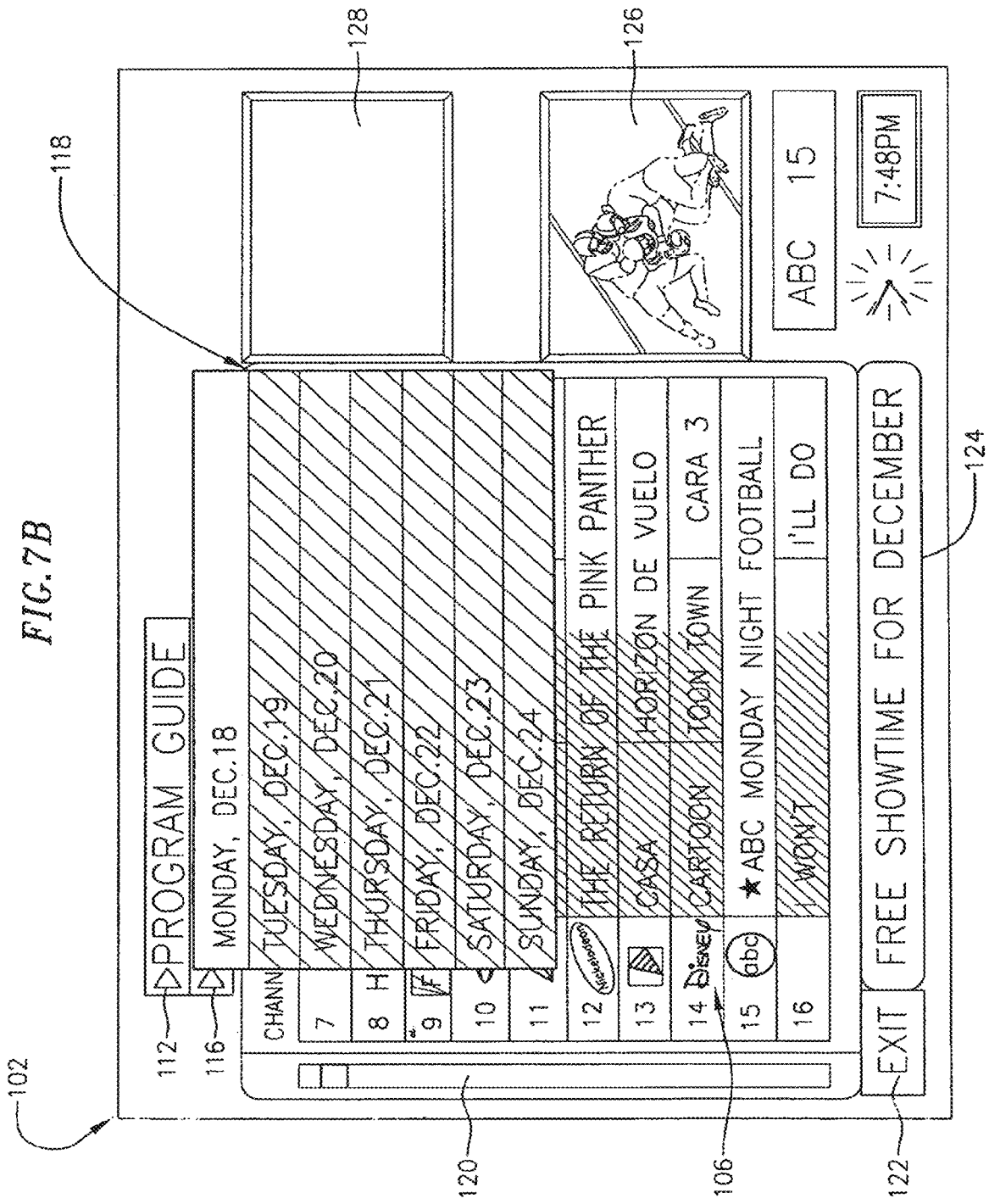
Figure 7C:
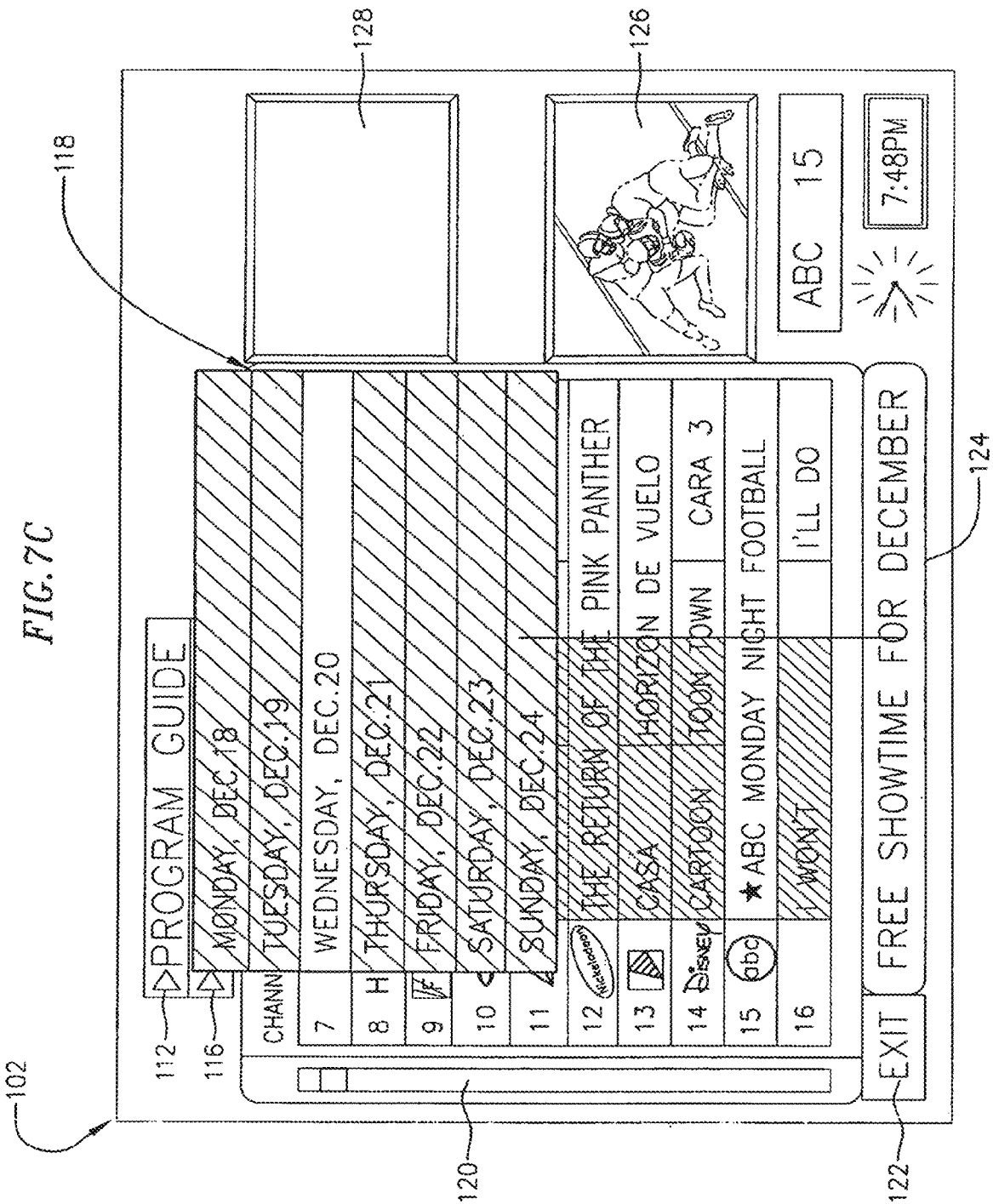

FIGS. 7A-7D depict a method of navigating to a submode menu with the program guide 102. One of the advantages of the television schedule system of the present invention is that the submode menus dynamically change depending on the Mode. For example, if the viewer desires to view the programs on a different day (other than the current day), he or she navigates to date area 116 by pressing once on upper button 42 of global controller 22. This moves the viewer to date area 116, where a submode menu 118 automatically scrolls down, as shown in FIG. 7B. The viewer may then scroll through the days of the week with rolling cylinder 24, which will become highlighted as the cursor moves through each day. To select another date, the viewer simply clicks on cylinder 24 and program matrix 106 jumps forward to another day, for example, Wednesday, as shown in FIG. 7D.

Figure 8A:
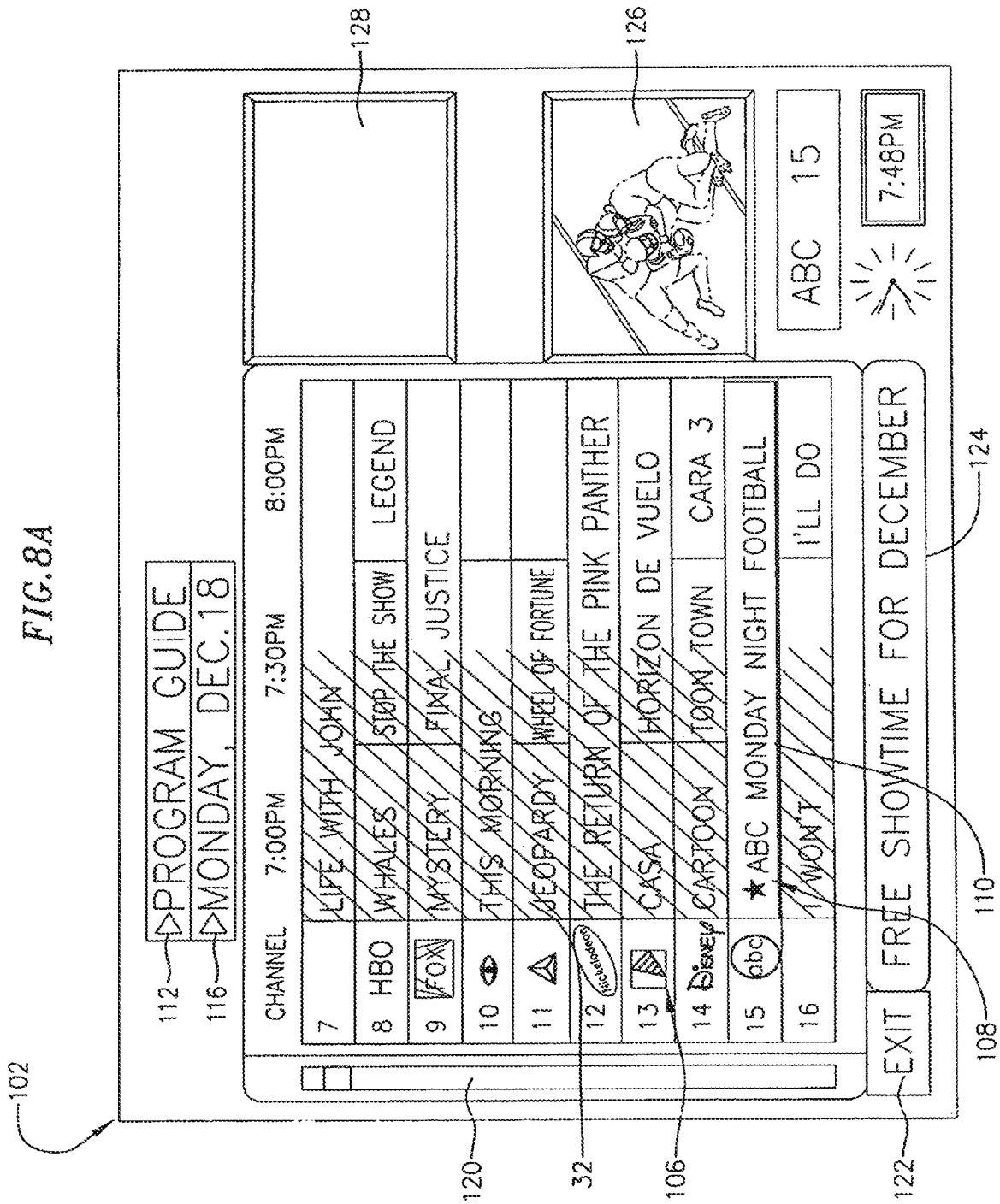
Figure 8B:
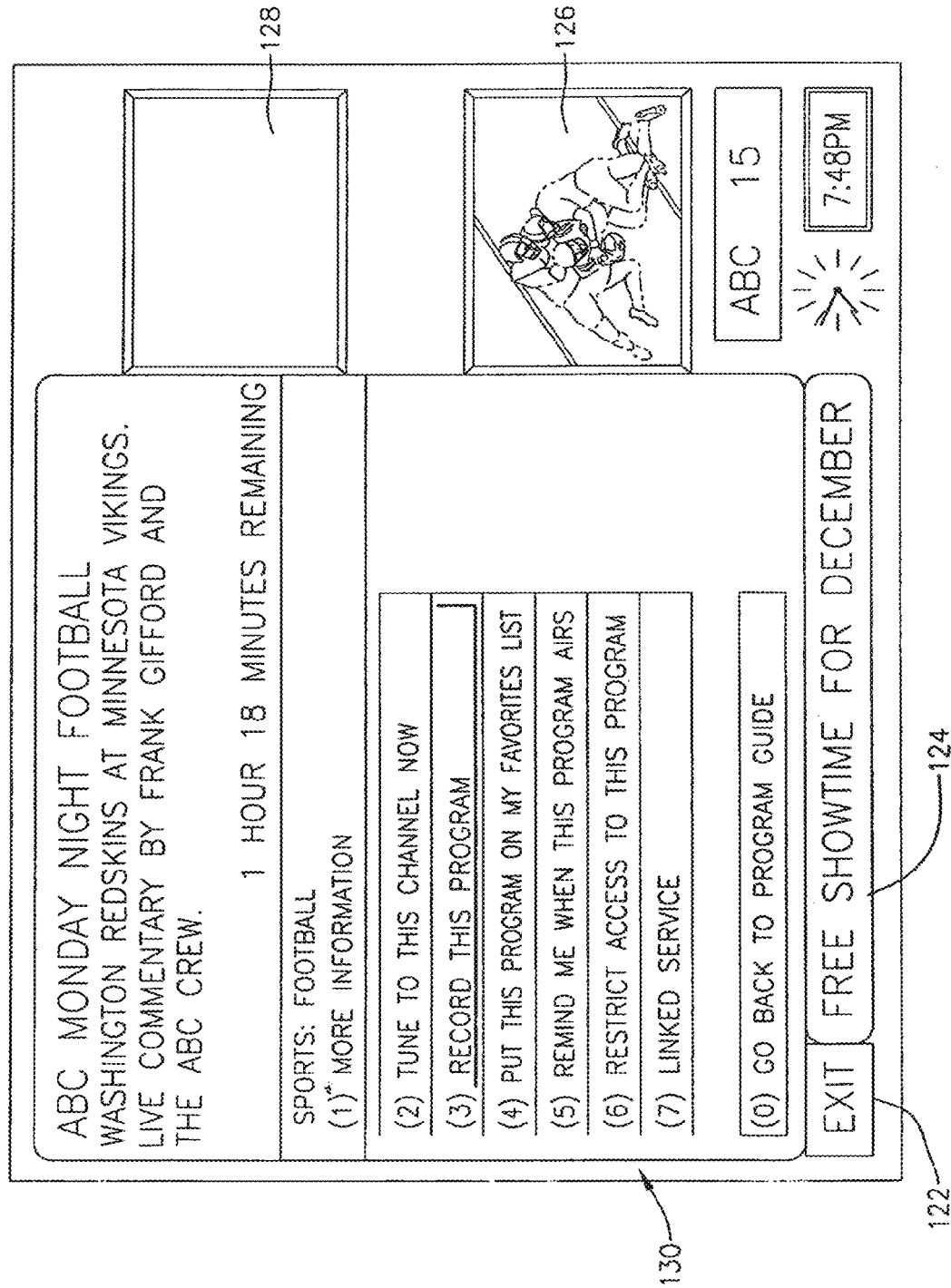

FIGS. 8A-SD illustrate a method of opening up Item Info-Menus with remote control device 2. As the viewer is scrolling around program matrix 106, clicking on a selected item will open up its InfoMenu 130, as shown in FIG. 8B. The InfoMenu 130 is a gateway to information about programs and items and services linked to them. For example, the viewer may scroll down InfoMenu 130 to the item "record this program". Once the item is selected, the viewer simply clicks on the item and a record submenu 152 appears where the viewer can specify how this program is to be added to the recording list (see FIG. 8C). The viewer can scroll up and down record submenu 152 and click on the desired choice. If the viewer scrolls up on the InfoMenu 130 instead of down, the info item will highlight in yellow and expand downward to review additional information about the program item, as shown in FIG. 8D. This expanded info item 154 will collapse automatically when the viewer scrolls downward.

The system and method of the present invention may be configured to automatically or manually customize the television schedule guide to an individual viewer or a group of viewers, e.g., a family. In this embodiment, the remote control device may be used to select certain programs, and a memory stores the television programs that have been selected by the viewer. The programs can be selected for a variety of reasons, such as a designated the program as a favorite, placing a reminder to watch the program or, when the television schedule system includes a recording device, placing an automatic reminder to the program guide to record the program. In a specific configuration, the system further includes a visual display, such as a physical icon within the cell, for indicating that a program has been selected. In addition, the program guide includes a selection window that displays some or all of the programs that have been selected by the viewer. The input device will allow the viewer to activate and deactivate the selection window, and to move between each program within the selection window and activate programs to obtain information associated with the selected program.

In an exemplary embodiment, the system includes a database containing each program within the television schedule. The database may be included within a computer integrally combined with the television (e.g., PCTV), a computer that is coupled to the television through suitable lines, or the database may be accessed from a remote computer, e.g., via the internet or other communication medium. Within the database, each program is associated with a variety of criteria or features, such as particular actors, actresses, directors, the type of movie (e.g., action, comedy) and the like. When the viewer selects a program as a favorite, for example, he or she will have the option of designating the criteria or reason(s) that the program is a favorite (i.e., actor, director, etc.). The computer will include a processor and suitable software for automatically searching the database for other programs having the same criteria. The processor will automatically place the programs that include the designated criteria into the selection window and provide visual indication of each program in the matrix of cells in the program guide. In this way, the program guide will automatically customize itself to the individual viewer to facilitate use of the television schedule.

Figure 9D:
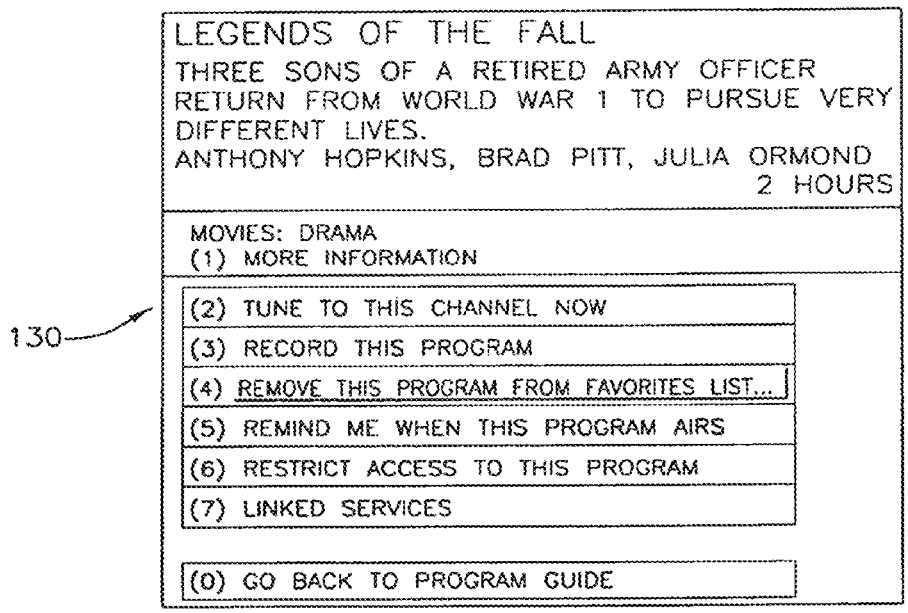
Figure 9E:
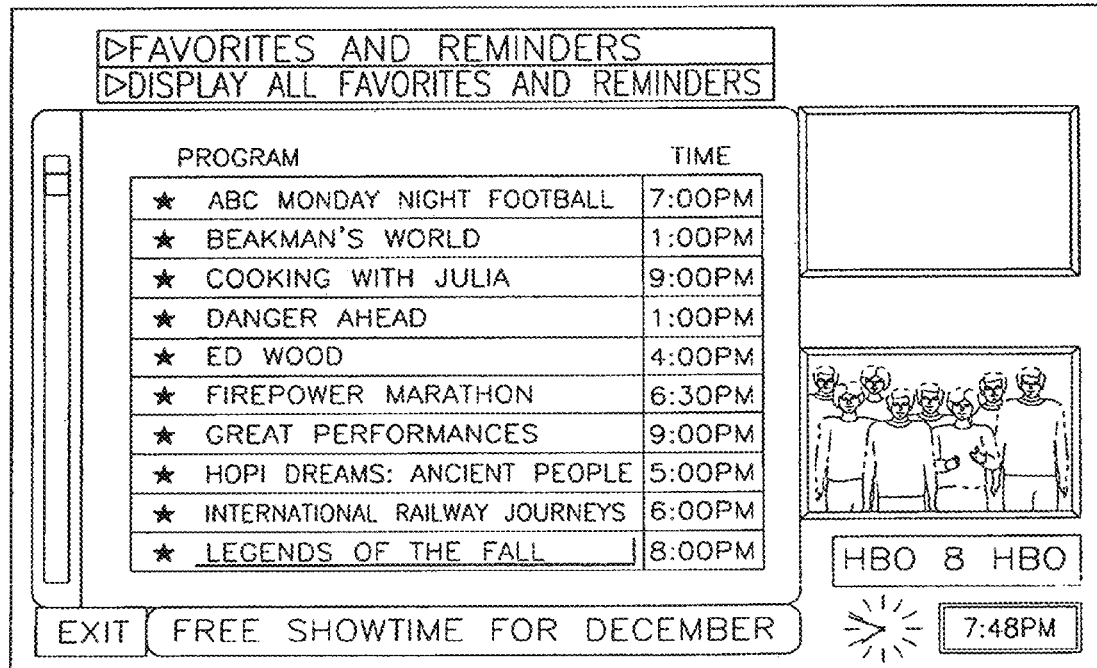

FIGS. 9A-9F illustrate a method for designating a program as a favorite. For example, an Item InfoMenu 130 is opened and the viewer scrolls down to section (4), and selects "Put this program on my favorite list" by clicking cylinder 24. A Favorites submenu automatically appears with a panel asking the viewer why this program has been shown as a favorite. For example, FIG. 9B illustrates a Favorites submenu 155 for a sitcom or program and FIG. 9C illustrates a submenu 156 for a movie. Other types of programs will have other unique submenus. The viewer is given a choice to scroll down to choose reasons for selecting the program as a favorite, such as performers, categories, series as a whole, etc. This feature could also be utilized to allow the viewer to go to the database of his or her preferences. It would then be possible to link to other programs with matching criteria, thereby allowing the viewer to customize the system to his or her needs. For example, if the viewer selects "performers" (see FIG. 9C), this would bring up a listing of known performers (or a similar appropriate listing) in this program. The viewer than identifies which ones are favorites. After specifying the criteria for being a favorite, a confirmation panel (not shown) may appear that allows the viewer to o.k. the action. When the viewer returns to the Items Info Menu, a favorite symbol has been added to the title and menu item (4) now gives the option to remove the program from the favorites list (see FIG. 9D). This cursor functionality is found throughout this system and is the easiest way to add or remove items from the list. After the program has been selected as a favorite, it is added to the Favorites and Reminders list 158, as shown in FIG. 9E. The system will then automatically search the guide to determine which programs include the specified performers. In addition, the system may be configured to continuously perform this search as new programs appear in the guide each day. Henceforth, some or all program items containing the viewer's specified performers would be marked with a star and appear on the "favorites" list.

Figure 10D:
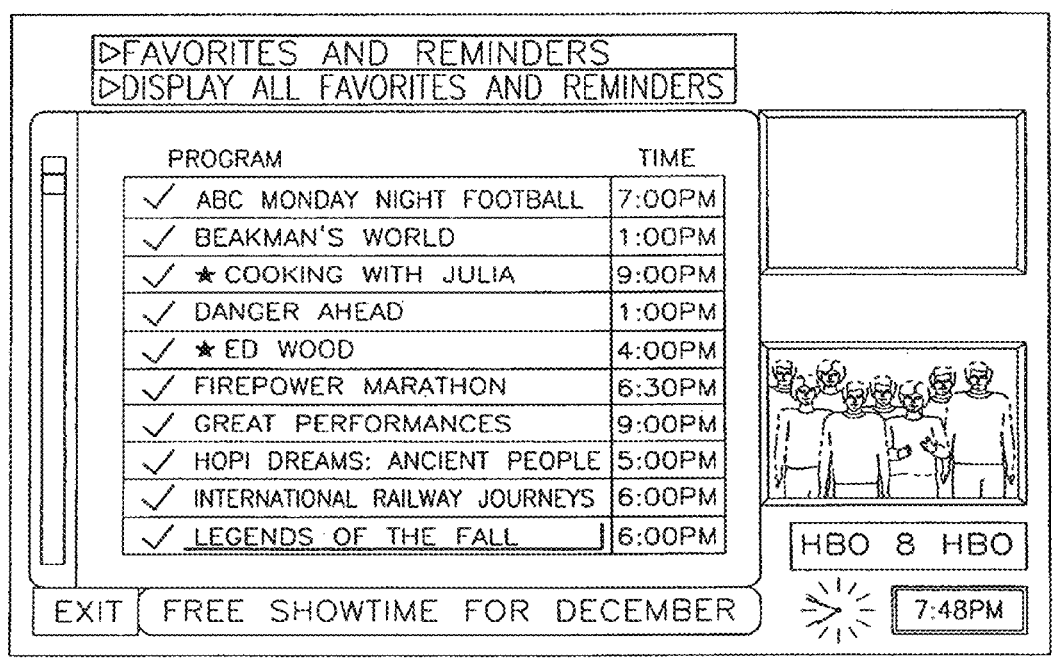

FIGS. 10A-10D illustrate a method for utilizing television schedule system to create a program reminder. Similar to the "favorites" method discussed above, an Item's InfoMenu 130 is opened and the viewer scrolls down to item (5) "Reminding when the program airs" and selects this item. A reminder submenu 160 is then activated to provide the viewer with various items for the times and number of reminders, as shown in 10B. This reminder submenu 160 can vary depending on the program's type or scheduling configuration. After specifying the recording option, a confirmation panel (not shown) will appear, allowing the viewer to o.k. the action. When the viewer has returned to the Item's InfoMenu 130 (see FIG. 10C), a reminder symbol has been added to the title and menu item (5) now gives the option to remove the program's reminder. After the program is scheduled for reminder, it is added to the "Favorites and Reminder" list, as shown in FIG. 10D.

Figure 11A:
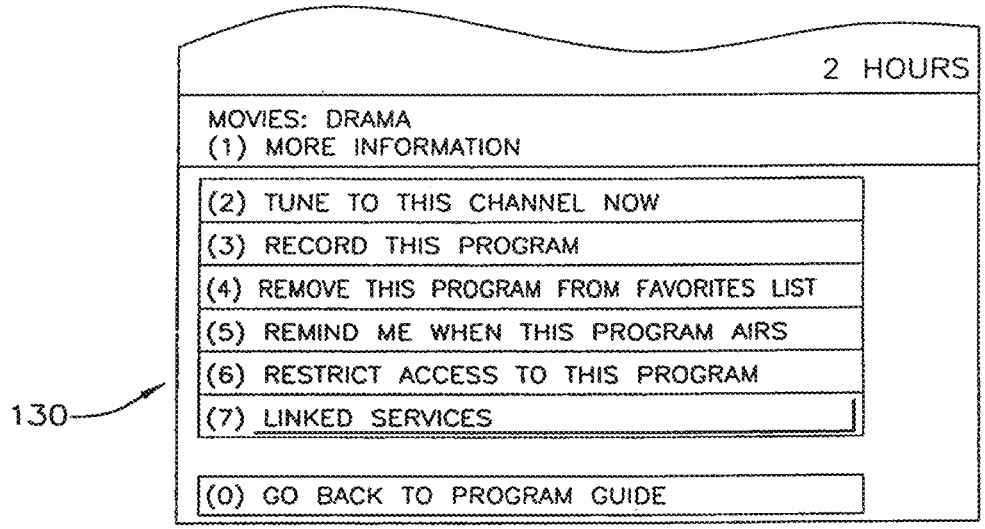
Figure 11B:
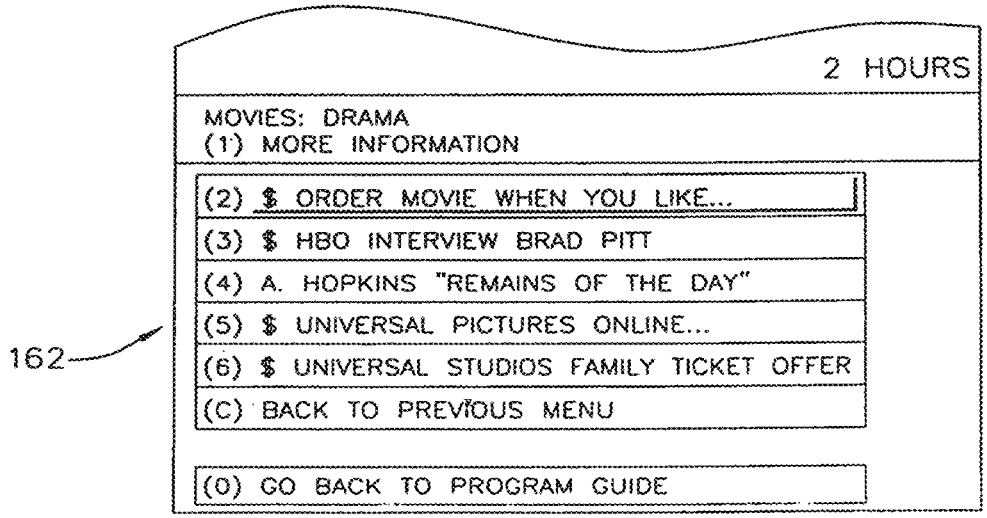

FIGS. 11A-11E illustrate a method of ordering video on demand. As shown in FIG. 10A, the viewer opens up the program's InfoMenu 130 and thumb scrolls down to the "order videos" item. The viewer is then presented with an easily scrollable matrix or menu (not shown) of movies or other programs that may be ordered. To facilitate this process, the system may include a text or feature searching program that allows the viewer to search for a particular movie, a particular type of movie, movies having a certain actor or actress, etc. Once a program has been selected, the viewer will be taken to a menu 162 associated with this program, as shown in FIG. 11B. The menu will allow the viewer to directly order the program, or order other programs, such as interviews, specials, etc., that are associated with the program. Some, denoted with a dollar sign, are purchasable. Free items would be instantly accessible to the viewer. The viewer may be prompted to a simple procedure to specify when the movie is to be delivered. When the viewer selects a particular program requiring a financial transaction, a purchasing sequence unfolds. As shown in FIG. 11C, the viewer is prompted to enter the master password/access code via the remote keypad or other means. For example, the viewer could swipe his or her credit card through slot 54 (FIG. 1). If the password/access code is accepted, the viewer is given a final opportunity to review the purchase and/or either confirm or return to the previous item menu (see FIG. 11D). When the viewer confirms his or her purchase and/or order, a receipt 170 is shown (FIG. 11E). The viewer is given the choice of returning to the previous item menu or, as always, at the very bottom item "0", to return to the program guide.

Although the foregoing invention has been described in detail for purposes of clarity, it will be obvious that certain modifications may be practiced within the scope of the appended claims. For example, the system may be configured for sorting, mixing and preparing a special customized line-up of channels within program guide 102. In addition, the viewer can automatically tune to a desired program or can select different programs for automatic recording. A detail description of suitable systems for automatic tuning and automatic recording can be found in commonly assigned U.S. Pat. No. 4,706,121 and application Ser. No. 08/423,411, the complete disclosure of which is incorporated herein by reference.

What is claimed is:

1. A method of visually indicating progression of programs, the method comprising:
generating for simultaneous display information identifying a first program and information identifying a second program;
generating for simultaneous display with the information identifying the first program and the information identifying the second program a first time indicator corresponding to the first program and a second time indicator corresponding to the second program, wherein:
a left edge of the first time indicator represents a start of the first program, and a right edge of the first time indicator represents an end of the first program;
a left edge of the second time indicator represents a start of the second program, and a right edge of the second time indicator represents an end of the second program;
a first portion of the first time indicator is visually distinguished from a second portion of the first time indicator, wherein a length of the first portion of the first time indicator represents a length of time of a previously presented segment of the first program; and
a first portion of the second time indicator is visually distinguished from a second portion of the second time indicator, wherein a length of the first portion of the second time indicator represents a length of time of a previously presented segment of the second program.

2. The method of claim 1, wherein the first portion of the first time indicator is visually distinguished from the second portion of the first time indicator by shading the first portion of the first time indicator.

3. The method of claim 1, wherein the first portion of the first time indicator is visually distinguished from the second portion of the first time indicator by shading the second portion of the first time indicator.

4. The method of claim 1, wherein the first program is a television program that is currently broadcast, and
the previously presented segment of the first program corresponds to a segment of the first program that has already been broadcast.

5. The method of claim 1, wherein the first time indicator is displayed as an overlay on top of the information identifying the first program.

6. The method of claim 1, wherein the first time indicator is displayed on a first area of a display screen and the information identifying the first program is displayed on a second area of the display screen.

7. The method of claim 1, wherein the first time indicator is updated at regular time intervals to reflect an increase in the length of time of the previously presented segment of the first program.

8. The method of claim 1 further comprising causing the first program to be displayed in response to a user selection of the first time indicator.

9. The method of claim 1 further comprising causing additional information related to the first program to be displayed in response to user input to navigate a cursor to the first time indicator.

10. The method of claim 1, wherein the first time indicator is displayed outside a window showing a playback of the first program.

11. The method of claim 1, wherein the time indicator graphically depicts an increase in the length of time of the previously presented segment of the first program by moving a leading edge of the first portion of the first time indicator away from the left edge of the first time indicator and towards alignment with the right edge of the first time indicator.

12. The method of claim 1, wherein the time indicator graphically depicts an increase in the length of time of the previously presented segment of the first program by increasing the length of the first portion of the first time indicator by a first amount and decreasing the length of the second portion of the first time indicator by the first amount.

13. A system for visually indicating progression of programs, the system comprising:

processing circuitry configured to:
  generate for simultaneous display information identifying a first program and information identifying a second program;
  generate for simultaneous display with the information identifying the first program and the information identifying the second program a first time indicator corresponding to the first program and a second time indicator corresponding to the second program, wherein:
    a left edge of the first time indicator represents a start of the first program, and a right edge of the first time indicator represents an end of the first program;
    a left edge of the second time indicator represents a start of the second program, and a right edge of the second time indicator represents an end of the second program;
    a first portion of the first time indicator is visually distinguished from a second portion of the first time indicator, wherein a length of the first portion of the first time indicator represents a length of time of a previously presented segment of the first program; and
    a first portion of the second time indicator is visually distinguished from a second portion of the second time indicator, wherein a length of the first portion of the second time indicator represents a length of time of a previously presented segment of the second program.

14. The system of claim 13, wherein the first portion of the first time indicator is visually distinguished from the second portion of the first time indicator by shading the first portion of the first time indicator.

15. The system of claim 13, wherein the first portion of the first time indicator is visually distinguished from the second portion of the first time indicator by shading the second portion of the time indicator.

16. The system of claim 13, wherein the first program is a television program that is currently broadcast,
  the previously presented segment of the first program corresponds to a segment of the first program that has already been broadcast.

17. The system of claim 13, wherein the processing circuitry is further configured to generate for display the first time indicator as an overlay on top of the information identifying the first program.

18. The system of claim 13, wherein the processing circuitry is further configured to generate for display the first time indicator on a first area of a display screen and the information identifying the first program on a second area of the display screen.

19. The system of claim 13, wherein then processing circuitry is further configured to update the first time indicator at regular time intervals to reflect an increase in the length of time of the previously presented segment of the first program.

20. The system of claim 13, wherein the processing circuitry is further configured to cause the first program to be displayed in response to a user selection of the first time indicator.

21. The system of claim 13, wherein the processing circuitry is further configured to cause additional information related to the first program to be displayed in response to user input to navigate a cursor to the first time indicator.

22. The system of claim 13, wherein the first time indicator is displayed outside a window showing a playback of the first program.

23. The system of claim 13, wherein the first time indicator graphically depicts an increase in the length of time of the previously presented segment of the first program by moving a leading edge of the first portion of the first time indicator away from the left edge of the first time indicator and towards alignment with the right edge of the first time indicator.

24. The system of claim 13, wherein the first time indicator graphically depicts an increase in the length of time of the previously presented segment of the first program by increasing the length of the first portion of the first time indicator by a first amount and decreasing the length of the second portion of the first time indicator by the first amount.

25. The method of claim 1, further comprising generating for display a plurality rows corresponding to a plurality of programs, wherein:
  a row corresponding to the first program comprises the information identifying the first program and the first time indicator; and
  a row corresponding to the second program comprises the information identifying the second program and the second time indicator.

26. The system of claim 13, wherein the processing circuitry is further configured to generate for display a plurality rows corresponding to a plurality of programs, wherein:
  a row corresponding to the first program comprises the information identifying the first program and the first time indicator; and
  a row corresponding to the second program comprises the information identifying the second program and the second time indicator.

27. A method of visually indicating progression of programs, the method comprising:
  generating for simultaneous display information identifying a first program and information identifying a second program;
  generating for simultaneous display with the information identifying the first program and the information identifying the second program a first time indicator corresponding to the first program and a second time indicator corresponding to the second program, wherein:
    a left edge of the first time indicator represents a start of the first program, and a right edge of the first time indicator represents an end of the first program;
    a left edge of the second time indicator represents a start of the second program, and a right edge of the second time indicator represents an end of the second program;
    a first portion of the first time indicator is visually distinguished from a second portion of the first time indicator, wherein a length of the first portion of the first time indicator represents a length of time of a previously transmitted segment of the first program; and
    a first portion of the second time indicator is visually distinguished from a second portion of the second time indicator, wherein a length of the first portion of the second time indicator represents a length of time of a previously transmitted segment of the second program.

28. A system for visually indicating progression of programs, the system comprising:
  processing circuitry configured to:
    generate for simultaneous display information identifying a first program and information identifying a second program;
    generate for simultaneous display with the information identifying the first program and the information identifying the second program a first time indicator corresponding to the first program and a second time indicator corresponding to the second program, wherein:

a left edge of the first time indicator represents a start of the first program, and a right edge of the first time indicator represents an end of the first program;

a left edge of the second time indicator represents a start of the second program, and a right edge of the second time indicator represents an end of the second program;

a first portion of the first time indicator is visually distinguished from a second portion of the first time indicator, wherein a length of the first portion of the first time indicator represents a length of time of a previously transmitted segment of the first program; and a first portion of the second time indicator is visually distinguished from a second portion of the second time indicator, wherein a length of the first portion of the second time indicator represents a length of time of a previously transmitted segment of the second program.

* * * * *